US012704696B2

(12) United States Patent
Jhang et al.

(10) Patent No.: US 12,704,696 B2
(45) Date of Patent: Aug. 11, 2026

(54) OPTICAL IMAGING LENS

(71) Applicant: GENIUS ELECTRONIC OPTICAL (XIAMEN) CO., LTD., Xiamen (CN)

(72) Inventors: Jia-Sin Jhang, Xiamen (CN); Maozong Lin, Xiamen (CN); Zhao Wang, Xiamen (CN)

(73) Assignee: GENIUS ELECTRONIC OPTICAL (XIAMEN) CO., LTD., Xiamen (CN)

(*) Notice: Subject to any disclaimer, the term of this patent is extended or adjusted under 35 U.S.C. 154(b) by 1066 days.

(21) Appl. No.: 17/861,253

(22) Filed: Jul. 11, 2022

(65) Prior Publication Data

US 2023/0221528 A1 Jul. 13, 2023

(30) Foreign Application Priority Data

Jan. 12, 2022 (CN) ........................ 202210032760.5

(51) Int. Cl.
*G02B 9/64* (2006.01)

(52) U.S. Cl.
CPC ...................................... *G02B 9/64* (2013.01)

(58) Field of Classification Search
CPC .............................. G02B 13/0045; G02B 9/64
See application file for complete search history.

(56) References Cited

U.S. PATENT DOCUMENTS

| | | | |
|---|---|---|---|
| 9,983,389 | B2 | 5/2018 | Lee |
| 2021/0191085 | A1 | 6/2021 | Lin et al. |
| 2021/0364746 | A1 | 11/2021 | Chen |

FOREIGN PATENT DOCUMENTS

| | | | | |
|---|---|---|---|---|
| CN | 109856783 | | 6/2019 | |
| CN | 112415721 | | 2/2021 | |
| CN | 112415722 | | 2/2021 | |
| CN | 112612106 | | 4/2021 | |
| CN | 112612107 | | 4/2021 | |
| CN | 112612107 A | * | 4/2021 | ......... G02B 13/0045 |
| CN | 112612108 | | 4/2021 | |
| CN | 112612108 A | * | 4/2021 | ............... G02B 9/64 |
| CN | 113805310 | | 12/2021 | |
| CN | 113805310 A | * | 12/2021 | ......... G02B 13/0045 |
| TW | I690726 | | 4/2020 | |

OTHER PUBLICATIONS

"Office Action of Taiwan Counterpart Application", issued on Jun. 27, 2023, p. 1-p. 9.
"Office Action of China Counterpart Application", issued on Feb. 21, 2024, p. 1-p. 21.

* cited by examiner

*Primary Examiner* — Jennifer D. Carruth
*Assistant Examiner* — Agnes Dobrowolski
(74) *Attorney, Agent, or Firm* — JCIPRNET

(57) ABSTRACT

An optical imaging lens including a first lens element, a second lens element, a third lens element, a fourth lens element, a fifth lens element, a sixth lens element, a seventh lens element, an eighth lens element, and a ninth lens element sequentially along an optical axis from an object side to an image side is provided. The first lens element has positive refracting power. A periphery region of the image-side surface of the third lens element is convex. A periphery region of the object-side surface of the fifth lens element is convex. The sixth lens element has positive refracting power. A periphery region of the image-side surface of the seventh lens element is convex. Lens elements of the optical imaging lens are only the nine lens elements described above, and the optical imaging lens satisfies: ALT/Tavg2345≥10.000.

20 Claims, 25 Drawing Sheets

| First embodiment | | | | | | |
|---|---|---|---|---|---|---|
| EFL=5.249 mm, HFOV=45.360°, TTL=8.927 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.360 | | | |
| First lens element 1 | Object-side surface 11 | 3.938 | 0.775 | 1.545 | 55.987 | 8.786 |
| | Image-side surface 12 | 20.404 | 0.050 | | | |
| Second lens element 2 | Object-side surface 21 | 8.335 | 0.324 | 1.671 | 19.243 | -35.743 |
| | Image-side surface 22 | 6.103 | 0.468 | | | |
| Third lens element 3 | Object-side surface 31 | 49.425 | 0.385 | 1.545 | 55.987 | 26.802 |
| | Image-side surface 32 | -20.747 | 0.517 | | | |
| Fourth lens element 4 | Object-side surface 41 | -20.555 | 0.437 | 1.671 | 19.243 | -48.701 |
| | Image-side surface 42 | -54.983 | 0.065 | | | |
| Fifth lens element 5 | Object-side surface 51 | -14.935 | 0.526 | 1.640 | 23.529 | -27.940 |
| | Image-side surface 52 | -88.677 | 0.078 | | | |
| Sixth lens element 6 | Object-side surface 61 | -18.975 | 1.270 | 1.545 | 55.987 | 14.740 |
| | Image-side surface 62 | -5.787 | 0.050 | | | |
| Seventh lens element 7 | Object-side surface 71 | 1.923 | 0.310 | 1.661 | 20.373 | -43.537 |
| | Image-side surface 72 | 1.687 | 0.373 | | | |
| Eighth lens element 8 | Object-side surface 81 | 4.006 | 0.901 | 1.545 | 55.987 | 5.107 |
| | Image-side surface 82 | -8.461 | 1.165 | | | |
| Ninth lens element 9 | Object-side surface 91 | -7.539 | 0.315 | 1.535 | 55.711 | -6.220 |
| | Image-side surface 92 | 6.090 | 0.500 | | | |
| Filter F | Object-side surface F1 | Infinity | 0.210 | 1.517 | 64.167 | |
| | Image-side surface F2 | Infinity | 0.207 | | | |
| | Image plane 99 | Infinity | | | | |

FIG. 8

| Surface | K | $a_4$ | $a_6$ | $a_8$ | $a_{10}$ |
|---|---|---|---|---|---|
| 11 | 2.116068E-01 | 5.713864E-04 | 2.906815E-03 | -3.724357E-03 | 2.677170E-03 |
| 12 | 0.000000E+00 | -9.422066E-04 | -2.599755E-03 | 2.868259E-03 | -3.217987E-04 |
| 21 | -6.428219E+00 | -1.008416E-02 | 4.952610E-04 | -2.293264E-03 | 4.589736E-03 |
| 22 | 3.550652E+00 | -1.162550E-02 | -6.295123E-04 | -3.566111E-04 | 1.284063E-03 |
| 31 | 0.000000E+00 | -6.592481E-03 | 3.583231E-03 | -6.913765E-03 | 4.318689E-03 |
| 32 | 0.000000E+00 | -7.843559E-03 | 1.445418E-03 | -2.971453E-03 | 9.534204E-04 |
| 41 | 0.000000E+00 | -2.256494E-02 | 4.776251E-03 | -1.527029E-02 | 1.885245E-02 |
| 42 | 0.000000E+00 | 8.408432E-03 | -3.223471E-02 | 2.196534E-02 | -8.840115E-03 |
| 51 | -1.723153E+01 | 1.264657E-02 | -1.869884E-02 | 7.301127E-03 | -1.009344E-03 |
| 52 | 0.000000E+00 | 2.707914E-03 | -1.247031E-02 | 1.134149E-02 | -6.052159E-03 |
| 61 | 0.000000E+00 | 2.041215E-02 | -2.782190E-02 | 1.983546E-02 | -8.370836E-03 |
| 62 | 0.000000E+00 | -3.308427E-02 | 3.030475E-02 | -2.247717E-02 | 9.524157E-03 |
| 71 | -1.086056E+01 | 2.309148E-02 | -1.685402E-02 | 5.431596E-03 | -1.098074E-03 |
| 72 | -5.196619E+00 | 1.313441E-02 | -1.635994E-02 | 6.194074E-03 | -1.275284E-03 |
| 81 | -3.486091E-01 | 1.711664E-02 | -2.156458E-02 | 7.894653E-03 | -1.573965E-03 |
| 82 | 0.000000E+00 | 2.075279E-02 | -6.996545E-03 | 2.500325E-03 | -5.658486E-04 |
| 91 | 5.448845E-01 | -3.283979E-02 | 1.000185E-02 | -2.193117E-03 | 3.182911E-04 |
| 92 | -2.778038E+00 | 3.750617E-03 | -3.142016E-03 | 5.134424E-04 | -4.353532E-05 |
| Surface | $a_{12}$ | $a_{14}$ | $a_{16}$ | $a_{18}$ | $a_{20}$ |
| 11 | -1.046577E-03 | 2.097010E-04 | -1.706644E-05 | 0.000000E+00 | 0.000000E+00 |
| 12 | -9.085239E-04 | 4.587790E-04 | -6.352979E-05 | 0.000000E+00 | 0.000000E+00 |
| 21 | -3.368742E-03 | 1.101448E-03 | -1.294179E-04 | 0.000000E+00 | 0.000000E+00 |
| 22 | -9.366602E-04 | 2.947909E-04 | -2.949610E-05 | 0.000000E+00 | 0.000000E+00 |
| 31 | -1.437529E-03 | 2.395834E-04 | -1.215477E-05 | -3.221540E-07 | 0.000000E+00 |
| 32 | -6.235347E-05 | -1.806753E-05 | 1.937906E-06 | 0.000000E+00 | 0.000000E+00 |
| 41 | -1.356687E-02 | 5.580827E-03 | -1.312569E-03 | 1.647052E-04 | -8.511174E-06 |
| 42 | 2.092236E-03 | -2.744250E-04 | 1.688366E-05 | -1.488613E-07 | -1.829177E-08 |
| 51 | -1.330699E-04 | 7.978999E-05 | -1.395953E-05 | 1.144122E-06 | -3.696411E-08 |
| 52 | 1.930462E-03 | -3.742601E-04 | 4.353961E-05 | -2.801394E-06 | 7.667989E-08 |
| 61 | 2.175546E-03 | -3.522464E-04 | 3.468895E-05 | -1.901821E-06 | 4.443875E-08 |
| 62 | -2.439687E-03 | 3.889521E-04 | -3.787102E-05 | 2.067611E-06 | -4.859263E-08 |
| 71 | 1.534513E-04 | -1.599292E-05 | 1.204802E-06 | -5.651044E-08 | 1.185451E-09 |
| 72 | 1.565407E-04 | -1.180840E-05 | 5.375151E-07 | -1.356123E-08 | 1.458320E-10 |
| 81 | 1.843530E-04 | -1.310544E-05 | 5.578630E-07 | -1.309445E-08 | 1.303750E-10 |
| 82 | 7.225103E-05 | -5.368029E-06 | 2.317673E-07 | -5.402408E-09 | 5.261300E-11 |
| 91 | -2.814571E-05 | 1.507660E-06 | -4.799773E-08 | 8.384390E-10 | -6.208000E-12 |
| 92 | 2.211120E-06 | -6.955727E-08 | 1.324027E-09 | -1.391600E-11 | 6.200000E-14 |

Longitudinal spherical aberration
Field
1.00

−0.018 0 0.016
(mm)

Field curvature (sagittal direction)
HFOV (°)
41.945

−0.020 0 0.015
(mm)

Field curvature (tangential direction)
HFOV (°)
41.945

−0.04 0 0.045
(mm)

Distortion
HFOV (°)
41.945

0 9
(%)

| Second embodiment | | | | | | |
|---|---|---|---|---|---|---|
| EFL=6.866 mm, HFOV=41.945°, TTL=8.865 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.900 | | | |
| First lens element 1 | Object-side surface 11 | 3.098 | 1.145 | 1.545 | 55.987 | 7.144 |
| | Image-side surface 12 | 13.064 | 0.068 | | | |
| Second lens element 2 | Object-side surface 21 | 7.340 | 0.377 | 1.671 | 19.243 | -19.541 |
| | Image-side surface 22 | 4.624 | 0.434 | | | |
| Third lens element 3 | Object-side surface 31 | 20.397 | 0.370 | 1.545 | 55.987 | 31.029 |
| | Image-side surface 32 | -99.668 | 0.401 | | | |
| Fourth lens element 4 | Object-side surface 41 | -26.712 | 0.400 | 1.671 | 19.243 | -98.903 |
| | Image-side surface 42 | -44.687 | 0.141 | | | |
| Fifth lens element 5 | Object-side surface 51 | -15.461 | 0.412 | 1.640 | 23.529 | -50.236 |
| | Image-side surface 52 | -29.900 | 0.208 | | | |
| Sixth lens element 6 | Object-side surface 61 | -21.046 | 0.702 | 1.545 | 55.987 | 38.170 |
| | Image-side surface 62 | -10.598 | 0.186 | | | |
| Seventh lens element 7 | Object-side surface 71 | 4.616 | 0.460 | 1.661 | 20.373 | -67.738 |
| | Image-side surface 72 | 4.021 | 0.268 | | | |
| Eighth lens element 8 | Object-side surface 81 | 4.477 | 0.706 | 1.545 | 55.987 | 7.570 |
| | Image-side surface 82 | -51.146 | 1.120 | | | |
| Ninth lens element 9 | Object-side surface 91 | -7.627 | 0.538 | 1.535 | 55.711 | -4.932 |
| | Image-side surface 92 | 4.161 | 0.500 | | | |
| Filter F | Object-side surface F1 | Infinity | 0.210 | 1.517 | 64.167 | |
| | Image-side surface F2 | Infinity | 0.217 | | | |
| | Image plane 99 | Infinity | | | | |

FIG. 12

| Surface | K | $a_4$ | $a_6$ | $a_8$ | $a_{10}$ |
|---|---|---|---|---|---|
| 11 | 1.312603E-01 | 3.131885E-04 | 3.844463E-04 | -2.416421E-04 | 1.247808E-04 |
| 12 | 0.000000E+00 | -8.145210E-03 | 5.705068E-03 | -2.222625E-03 | 6.097000E-04 |
| 21 | -2.002132E+00 | -1.426193E-02 | 6.585256E-03 | -2.303362E-03 | 7.399277E-04 |
| 22 | 3.334029E+00 | -1.113585E-02 | 1.655697E-03 | -8.708227E-04 | 5.136856E-04 |
| 31 | 0.000000E+00 | -4.300010E-03 | -1.846003E-03 | 2.225689E-04 | -3.801821E-04 |
| 32 | 0.000000E+00 | -5.261326E-03 | -2.208596E-03 | 3.805651E-04 | -3.715632E-04 |
| 41 | 0.000000E+00 | -1.550682E-02 | -5.423547E-03 | 2.128270E-03 | -7.314088E-04 |
| 42 | 0.000000E+00 | 1.297919E-03 | -2.568787E-02 | 2.163492E-02 | -1.274643E-02 |
| 51 | -1.940297E+01 | 1.865093E-02 | -3.674225E-02 | 2.708449E-02 | -1.210349E-02 |
| 52 | 0.000000E+00 | 1.245113E-02 | -1.974591E-02 | 9.726288E-03 | -2.511562E-03 |
| 61 | 0.000000E+00 | 6.185427E-03 | -2.914060E-03 | -1.835237E-03 | 1.828876E-03 |
| 62 | 0.000000E+00 | -1.863109E-02 | 5.366644E-03 | -3.109099E-03 | 1.403078E-03 |
| 71 | -1.766647E+01 | 3.100281E-03 | -6.550750E-03 | 1.767157E-03 | -2.201163E-04 |
| 72 | -7.165569E+00 | -5.092615E-03 | -4.241192E-03 | 1.511966E-03 | -2.555722E-04 |
| 81 | -2.447083E-01 | -5.775626E-03 | -2.014982E-03 | 4.157394E-04 | -7.050127E-05 |
| 82 | 0.000000E+00 | 2.092036E-02 | -3.542053E-03 | 1.738587E-04 | 2.956701E-06 |
| 91 | -2.473119E-01 | -1.943656E-02 | 3.651467E-03 | -3.728298E-04 | 2.942877E-05 |
| 92 | -9.533417E+00 | -1.457103E-02 | 2.374741E-03 | -2.751241E-04 | 2.036374E-05 |
| Surface | $a_{12}$ | $a_{14}$ | $a_{16}$ | $a_{18}$ | $a_{20}$ |
| 11 | -3.316910E-05 | 4.778270E-06 | -2.954278E-07 | 0.000000E+00 | 0.000000E+00 |
| 12 | -1.078715E-04 | 1.063899E-05 | -3.787915E-07 | 0.000000E+00 | 0.000000E+00 |
| 21 | -1.734390E-04 | 2.603215E-05 | -1.657416E-06 | 0.000000E+00 | 0.000000E+00 |
| 22 | -2.016941E-04 | 4.118763E-05 | -2.889326E-06 | 0.000000E+00 | 0.000000E+00 |
| 31 | 2.492664E-04 | -6.205907E-05 | 6.373848E-06 | 0.000000E+00 | 0.000000E+00 |
| 32 | 2.054154E-04 | -4.282028E-05 | 2.790985E-06 | 0.000000E+00 | 0.000000E+00 |
| 41 | -5.134151E-04 | 5.563758E-04 | -2.086671E-04 | 3.669629E-05 | -2.550822E-06 |
| 42 | 4.970121E-03 | -1.265802E-03 | 2.066506E-04 | -1.978071E-05 | 8.501437E-07 |
| 51 | 3.468848E-03 | -6.268573E-04 | 6.889572E-05 | -4.215871E-06 | 1.106064E-07 |
| 52 | 2.986822E-04 | 5.850921E-06 | -5.859527E-06 | 6.138442E-07 | -2.133933E-08 |
| 61 | -7.006584E-04 | 1.487576E-04 | -1.814439E-05 | 1.188191E-06 | -3.236846E-08 |
| 62 | -3.858400E-04 | 6.459761E-05 | -6.350483E-06 | 3.352607E-07 | -7.332058E-09 |
| 71 | -1.607814E-06 | 3.943324E-06 | -4.941424E-07 | 2.678840E-08 | -5.569620E-10 |
| 72 | 2.184857E-05 | -6.674256E-07 | -2.899258E-08 | 2.667628E-09 | -5.473600E-11 |
| 81 | 6.745530E-06 | -2.955924E-07 | 3.026813E-09 | 1.604950E-10 | -3.807000E-12 |
| 82 | -3.342789E-07 | -3.188049E-08 | 3.737999E-09 | -1.326970E-10 | 1.651000E-12 |
| 91 | -1.776141E-06 | 7.487873E-08 | -2.020975E-09 | 3.113600E-11 | -2.080000E-13 |
| 92 | -1.012130E-06 | 3.499816E-08 | -8.157110E-10 | 1.140100E-11 | -7.100000E-14 |

FIG. 13

| Third embodiment | | | | | | |
|---|---|---|---|---|---|---|
| EFL=6.768 mm, HFOV=41.410°, TTL=8.837 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.844 | | | |
| First lens element 1 | Object-side surface 11 | 3.156 | 1.047 | 1.545 | 55.987 | 7.188 |
| | Image-side surface 12 | 14.191 | 0.117 | | | |
| Second lens element 2 | Object-side surface 21 | 7.774 | 0.287 | 1.671 | 19.243 | -19.110 |
| | Image-side surface 22 | 4.785 | 0.427 | | | |
| Third lens element 3 | Object-side surface 31 | 29.539 | 0.484 | 1.545 | 55.987 | 34.683 |
| | Image-side surface 32 | -52.529 | 0.280 | | | |
| Fourth lens element 4 | Object-side surface 41 | -106.621 | 0.256 | 1.671 | 19.243 | 223.474 |
| | Image-side surface 42 | -62.625 | 0.344 | | | |
| Fifth lens element 5 | Object-side surface 51 | -13.177 | 0.255 | 1.640 | 23.529 | -28.865 |
| | Image-side surface 52 | -45.509 | 0.291 | | | |
| Sixth lens element 6 | Object-side surface 61 | -36.160 | 0.574 | 1.545 | 55.987 | 27.403 |
| | Image-side surface 62 | -10.646 | 0.371 | | | |
| Seventh lens element 7 | Object-side surface 71 | 3.764 | 0.545 | 1.661 | 20.373 | 71.479 |
| | Image-side surface 72 | 3.849 | 0.627 | | | |
| Eighth lens element 8 | Object-side surface 81 | 7.230 | 0.519 | 1.545 | 55.987 | 8.117 |
| | Image-side surface 82 | -11.178 | 0.651 | | | |
| Ninth lens element 9 | Object-side surface 91 | -7.920 | 0.908 | 1.535 | 55.711 | -4.440 |
| | Image-side surface 92 | 3.551 | 0.500 | | | |
| Filter F | Object-side surface F1 | Infinity | 0.210 | 1.517 | 64.167 | |
| | Image-side surface F2 | Infinity | 0.144 | | | |
| | Image plane 99 | Infinity | | | | |

FIG. 16

| Surface | K | $a_4$ | $a_6$ | $a_8$ | $a_{10}$ |
|---|---|---|---|---|---|
| 11 | 1.413900E-01 | 3.912026E-04 | 4.542972E-04 | -3.807901E-04 | 2.283893E-04 |
| 12 | 0.000000E+00 | -5.332887E-03 | 3.068870E-03 | -9.725039E-04 | 2.610703E-04 |
| 21 | -2.122847E+00 | -1.431008E-02 | 4.933396E-03 | -7.150152E-04 | -4.575446E-06 |
| 22 | 3.321593E+00 | -1.308625E-02 | 2.651348E-03 | -9.557988E-04 | 4.999440E-04 |
| 31 | 0.000000E+00 | -3.228113E-03 | -2.798342E-03 | 1.343739E-03 | -9.637992E-04 |
| 32 | 0.000000E+00 | -4.334492E-03 | -4.458169E-03 | 2.461259E-03 | -1.170400E-03 |
| 41 | 0.000000E+00 | -1.078040E-02 | -1.523202E-02 | 1.156481E-02 | -7.418524E-03 |
| 42 | 0.000000E+00 | -1.852593E-03 | -1.924059E-02 | 1.438694E-02 | -8.418178E-03 |
| 51 | -1.276587E+01 | 1.782002E-02 | -3.017231E-02 | 1.941002E-02 | -8.257496E-03 |
| 52 | 0.000000E+00 | 1.830565E-02 | -2.832675E-02 | 1.694156E-02 | -6.747442E-03 |
| 61 | 0.000000E+00 | 6.266320E-03 | -6.971346E-03 | 2.463662E-03 | -6.231229E-04 |
| 62 | 0.000000E+00 | -2.350441E-02 | 1.320967E-02 | -7.523890E-03 | 2.804344E-03 |
| 71 | -1.434751E+01 | -8.711954E-03 | 6.029166E-03 | -2.672413E-03 | 5.800139E-04 |
| 72 | -6.499785E+00 | -2.306176E-02 | 1.161454E-02 | -3.882109E-03 | 7.568187E-04 |
| 81 | 5.251719E-02 | -1.033277E-02 | 2.910214E-03 | -7.342115E-04 | 6.836338E-05 |
| 82 | 0.000000E+00 | 9.337057E-03 | 1.589255E-05 | -3.825477E-04 | 5.454114E-05 |
| 91 | -9.133192E-02 | -2.075328E-02 | 4.594901E-03 | -6.401917E-04 | 6.990678E-05 |
| 92 | -5.560489E+00 | -1.541053E-02 | 2.567107E-03 | -2.733640E-04 | 1.935475E-05 |
| Surface | $a_{12}$ | $a_{14}$ | $a_{16}$ | $a_{18}$ | $a_{20}$ |
| 11 | -7.001429E-05 | 1.100944E-05 | -6.878767E-07 | 0.000000E+00 | 0.000000E+00 |
| 12 | -5.218178E-05 | 6.706886E-06 | -3.711165E-07 | 0.000000E+00 | 0.000000E+00 |
| 21 | 4.280653E-05 | -8.863697E-06 | 6.308167E-07 | 0.000000E+00 | 0.000000E+00 |
| 22 | -2.124347E-04 | 5.194328E-05 | -5.220815E-06 | 0.000000E+00 | 0.000000E+00 |
| 31 | 3.923847E-04 | -7.360626E-05 | 5.613390E-06 | 0.000000E+00 | 0.000000E+00 |
| 32 | 3.451646E-04 | -5.011189E-05 | 2.378853E-06 | 0.000000E+00 | 0.000000E+00 |
| 41 | 3.443532E-03 | -1.125253E-03 | 2.424019E-04 | -3.128740E-05 | 1.832387E-06 |
| 42 | 3.675729E-03 | -1.122518E-03 | 2.250547E-04 | -2.648610E-05 | 1.391396E-06 |
| 51 | 2.431770E-03 | -4.664655E-04 | 5.525253E-05 | -3.712765E-06 | 1.103918E-07 |
| 52 | 1.868082E-03 | -3.493380E-04 | 4.232016E-05 | -3.021551E-06 | 9.684716E-08 |
| 61 | 1.024802E-04 | -7.393207E-06 | -2.797620E-07 | 7.637150E-08 | -3.383264E-09 |
| 62 | -6.931346E-04 | 1.140142E-04 | -1.172197E-05 | 6.736057E-07 | -1.651078E-08 |
| 71 | -7.795572E-05 | 6.793573E-06 | -3.780613E-07 | 1.239598E-08 | -1.846820E-10 |
| 72 | -9.416600E-05 | 7.573460E-06 | -3.792551E-07 | 1.068256E-08 | -1.282630E-10 |
| 81 | -1.310789E-06 | -2.848306E-07 | 2.848835E-08 | -1.176561E-09 | 1.967100E-11 |
| 82 | -3.185186E-06 | 6.745777E-08 | 8.618780E-10 | -4.928400E-11 | 3.060000E-13 |
| 91 | -5.331238E-06 | 2.616893E-07 | -7.825264E-09 | 1.296880E-10 | -9.140000E-13 |
| 92 | -9.330766E-07 | 3.017119E-08 | -6.210490E-10 | 7.300000E-12 | -3.700000E-14 |

FIG. 17

| Fourth embodiment | | | | | | |
|---|---|---|---|---|---|---|
| EFL=7.640 mm, HFOV=36.973°, TTL=9.763 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -1.060 | | | |
| First lens element 1 | Object-side surface 11 | 3.347 | 1.240 | 1.545 | 55.987 | 6.294 |
| | Image-side surface 12 | 110.150 | 0.050 | | | |
| Second lens element 2 | Object-side surface 21 | 13.565 | 0.359 | 1.640 | 23.529 | -11.839 |
| | Image-side surface 22 | 4.833 | 0.575 | | | |
| Third lens element 3 | Object-side surface 31 | 24.428 | 0.435 | 1.567 | 37.533 | 42.708 |
| | Image-side surface 32 | -6357.584 | 0.561 | | | |
| Fourth lens element 4 | Object-side surface 41 | -198.630 | 0.314 | 1.545 | 55.987 | 51.611 |
| | Image-side surface 42 | -24.703 | 0.185 | | | |
| Fifth lens element 5 | Object-side surface 51 | -16.070 | 0.354 | 1.567 | 37.533 | 45.386 |
| | Image-side surface 52 | -9.990 | 0.247 | | | |
| Sixth lens element 6 | Object-side surface 61 | -6.436 | 0.991 | 1.640 | 23.529 | -94.776 |
| | Image-side surface 62 | -7.628 | 0.291 | | | |
| Seventh lens element 7 | Object-side surface 71 | 5.716 | 0.523 | 1.661 | 20.373 | -17.364 |
| | Image-side surface 72 | 3.687 | 0.203 | | | |
| Eighth lens element 8 | Object-side surface 81 | 4.505 | 0.807 | 1.545 | 55.987 | 8.037 |
| | Image-side surface 82 | -161.901 | 1.264 | | | |
| Ninth lens element 9 | Object-side surface 91 | -8.251 | 0.515 | 1.535 | 55.711 | -5.901 |
| | Image-side surface 92 | 5.261 | 0.500 | | | |
| Filter F | Object-side surface F1 | Infinity | 0.210 | 1.517 | 64.167 | |
| | Image-side surface F2 | Infinity | 0.138 | | | |
| | Image plane 99 | Infinity | | | | |

FIG. 20

| Surface | K | $a_4$ | $a_6$ | $a_8$ | $a_{10}$ |
|---|---|---|---|---|---|
| 11 | 1.409147E-01 | 7.087759E-04 | -1.233096E-04 | 1.947263E-04 | -8.424739E-05 |
| 12 | 0.000000E+00 | -5.771350E-03 | 3.053132E-03 | -4.245322E-04 | -5.285097E-05 |
| 21 | -6.951353E+00 | -1.310220E-02 | 2.951719E-03 | 7.392566E-04 | -5.447776E-04 |
| 22 | 3.649128E+00 | -9.897195E-03 | -5.352660E-05 | 6.953095E-04 | -7.912644E-05 |
| 31 | 0.000000E+00 | -3.389033E-03 | -4.973814E-03 | 1.916353E-03 | -7.809471E-04 |
| 32 | 0.000000E+00 | -4.917916E-03 | -4.753379E-03 | 1.408398E-03 | -3.454281E-04 |
| 41 | 0.000000E+00 | -8.779261E-03 | -1.040583E-02 | 6.174791E-03 | -4.198899E-03 |
| 42 | 0.000000E+00 | -7.154879E-04 | -2.018800E-02 | 1.416528E-02 | -7.736006E-03 |
| 51 | 2.112785E+01 | 9.074233E-03 | -1.521423E-02 | 6.539959E-03 | -3.059537E-04 |
| 52 | 0.000000E+00 | 6.499563E-03 | -5.861459E-03 | -2.901206E-03 | 4.167022E-03 |
| 61 | 0.000000E+00 | 4.331022E-03 | 2.047717E-04 | -3.972928E-03 | 2.574473E-03 |
| 62 | 0.000000E+00 | -1.005463E-02 | 4.938389E-03 | -3.123873E-03 | 1.124413E-03 |
| 71 | -3.165818E+01 | -5.733288E-03 | 1.211777E-05 | -5.334340E-04 | 1.203246E-04 |
| 72 | -7.412067E+00 | -1.199762E-02 | 3.206391E-03 | -1.245593E-03 | 2.982418E-04 |
| 81 | -9.983374E-01 | -9.970597E-03 | 1.416671E-03 | -2.942187E-04 | 3.827766E-05 |
| 82 | 0.000000E+00 | 9.248347E-03 | -1.299270E-03 | 9.983945E-05 | -8.147092E-06 |
| 91 | 1.192855E-01 | -1.482447E-02 | 3.132789E-03 | -4.389297E-04 | 4.786427E-05 |
| 92 | -4.150001E+00 | -1.434533E-02 | 2.089771E-03 | -2.158672E-04 | 1.568420E-05 |
| Surface | $a_{12}$ | $a_{14}$ | $a_{16}$ | $a_{18}$ | $a_{20}$ |
| 11 | 2.287883E-05 | -3.220820E-06 | 1.850571E-07 | 0.000000E+00 | 0.000000E+00 |
| 12 | 2.802397E-05 | -3.811078E-06 | 1.831927E-07 | 0.000000E+00 | 0.000000E+00 |
| 21 | 1.380849E-04 | -1.654983E-05 | 7.618355E-07 | 0.000000E+00 | 0.000000E+00 |
| 22 | -5.238905E-05 | 2.138254E-05 | -2.062458E-06 | 0.000000E+00 | 0.000000E+00 |
| 31 | 2.721811E-04 | -4.278496E-05 | 2.406823E-06 | 0.000000E+00 | 0.000000E+00 |
| 32 | 1.192424E-04 | -1.846785E-05 | 6.595156E-07 | 0.000000E+00 | 0.000000E+00 |
| 41 | 2.087400E-03 | -6.485390E-04 | 1.255856E-04 | -1.441723E-05 | 7.632886E-07 |
| 42 | 2.992402E-03 | -7.725906E-04 | 1.281958E-04 | -1.251036E-05 | 5.504490E-07 |
| 51 | -8.521845E-04 | 3.672165E-04 | -6.945869E-05 | 6.433093E-06 | -2.381083E-07 |
| 52 | -2.010131E-03 | 5.293214E-04 | -7.962186E-05 | 6.411200E-06 | -2.145722E-07 |
| 61 | -8.766006E-04 | 1.899252E-04 | -2.621048E-05 | 2.074545E-06 | -7.062895E-08 |
| 62 | -2.488285E-04 | 3.604891E-05 | -3.437660E-06 | 1.986545E-07 | -5.246213E-09 |
| 71 | 4.870883E-07 | -3.603582E-06 | 5.331636E-07 | -3.213473E-08 | 7.138890E-10 |
| 72 | -4.276206E-05 | 3.764456E-06 | -2.001209E-07 | 5.888722E-09 | -7.326100E-11 |
| 81 | -3.188621E-06 | 1.197481E-07 | 2.761348E-09 | -4.097520E-10 | 1.047000E-11 |
| 82 | 4.627982E-07 | -6.806855E-09 | -6.034740E-10 | 3.069100E-11 | -4.400000E-13 |
| 91 | -3.552187E-06 | 1.682883E-07 | -4.871114E-09 | 7.869400E-11 | -5.450000E-13 |
| 92 | -7.869194E-07 | 2.656833E-08 | -5.762160E-10 | 7.248000E-12 | -4.000000E-14 |

FIG. 21

| Fifth embodiment | | | | | | |
|---|---|---|---|---|---|---|
| EFL=6.560 mm, HFOV=41.750°, TTL=9.719 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.686 | | | |
| First lens element 1 | Object-side surface 11 | 3.572 | 1.047 | 1.545 | 55.987 | 8.135 |
| | Image-side surface 12 | 16.319 | 0.050 | | | |
| Second lens element 2 | Object-side surface 21 | 8.116 | 0.434 | 1.671 | 19.243 | -28.113 |
| | Image-side surface 22 | 5.568 | 0.405 | | | |
| Third lens element 3 | Object-side surface 31 | 24.522 | 0.718 | 1.545 | 55.987 | 21.469 |
| | Image-side surface 32 | -22.245 | 0.538 | | | |
| Fourth lens element 4 | Object-side surface 41 | -10.538 | 0.653 | 1.671 | 19.243 | -10522.799 |
| | Image-side surface 42 | -10.817 | 0.061 | | | |
| Fifth lens element 5 | Object-side surface 51 | -8.604 | 0.418 | 1.640 | 23.529 | -20.411 |
| | Image-side surface 52 | -25.342 | 0.242 | | | |
| Sixth lens element 6 | Object-side surface 61 | -21.362 | 1.047 | 1.545 | 55.987 | 20.409 |
| | Image-side surface 62 | -7.452 | 0.050 | | | |
| Seventh lens element 7 | Object-side surface 71 | 5.602 | 0.657 | 1.661 | 20.373 | -26.998 |
| | Image-side surface 72 | 4.073 | 0.109 | | | |
| Eighth lens element 8 | Object-side surface 81 | 4.572 | 1.047 | 1.545 | 55.987 | 6.150 |
| | Image-side surface 82 | -11.644 | 1.066 | | | |
| Ninth lens element 9 | Object-side surface 91 | -7.588 | 0.418 | 1.535 | 55.711 | -4.599 |
| | Image-side surface 92 | 3.735 | 0.500 | | | |
| Filter F | Object-side surface F1 | Infinity | 0.210 | 1.517 | 64.167 | |
| | Image-side surface F2 | Infinity | 0.050 | | | |
| | Image plane 99 | Infinity | | | | |

FIG. 24

| Surface | K | $a_4$ | $a_6$ | $a_8$ | $a_{10}$ |
|---|---|---|---|---|---|
| 11 | 1.976160E-01 | 1.125160E-03 | 4.830950E-04 | -2.930995E-04 | 1.698684E-04 |
| 12 | 0.000000E+00 | -9.743504E-03 | 9.573281E-03 | -4.765574E-03 | 1.516922E-03 |
| 21 | -4.620111E+00 | -1.612698E-02 | 9.626688E-03 | -4.269690E-03 | 1.255935E-03 |
| 22 | 3.498332E+00 | -1.153178E-02 | 1.734894E-03 | -5.138190E-04 | 1.488228E-04 |
| 31 | 0.000000E+00 | -4.949505E-03 | -2.414271E-04 | -9.740068E-04 | 6.249135E-04 |
| 32 | 0.000000E+00 | -6.202064E-03 | -1.085370E-03 | -2.747924E-04 | 1.978512E-04 |
| 41 | 0.000000E+00 | -1.921620E-02 | 1.646203E-03 | -5.063958E-03 | 3.333002E-03 |
| 42 | 0.000000E+00 | 2.291306E-03 | -1.740122E-02 | 8.848966E-03 | -3.007607E-03 |
| 51 | -7.111916E+00 | 1.663248E-02 | -2.987992E-02 | 1.898371E-02 | -7.215557E-03 |
| 52 | 0.000000E+00 | 1.014569E-02 | -1.903031E-02 | 1.108076E-02 | -3.680437E-03 |
| 61 | 0.000000E+00 | 1.365957E-02 | -1.219470E-02 | 4.420722E-03 | -8.181199E-04 |
| 62 | 0.000000E+00 | -1.005094E-02 | -5.683281E-03 | 3.727874E-03 | -1.248065E-03 |
| 71 | -2.356763E+01 | 5.302553E-03 | -8.802775E-03 | 3.473213E-03 | -8.522655E-04 |
| 72 | -4.587739E+00 | -2.192800E-03 | -2.115929E-03 | 6.140241E-04 | -9.118196E-05 |
| 81 | -2.809849E-01 | -1.022727E-02 | 1.805877E-03 | -4.785163E-04 | 6.654307E-05 |
| 82 | 0.000000E+00 | 1.403412E-02 | -8.549358E-04 | -1.564066E-04 | 2.553221E-05 |
| 91 | -7.304446E-02 | -1.980029E-02 | 3.880737E-03 | -4.636500E-04 | 4.405457E-05 |
| 92 | -4.542469E+00 | -1.516262E-02 | 2.301715E-03 | -2.346575E-04 | 1.618995E-05 |
| Surface | $a_{12}$ | $a_{14}$ | $a_{16}$ | $a_{18}$ | $a_{20}$ |
| 11 | -5.125687E-05 | 8.221664E-06 | -5.712187E-07 | 0.000000E+00 | 0.000000E+00 |
| 12 | -3.019986E-04 | 3.459592E-05 | -1.741009E-06 | 0.000000E+00 | 0.000000E+00 |
| 21 | -2.140410E-04 | 2.047219E-05 | -8.303125E-07 | 0.000000E+00 | 0.000000E+00 |
| 22 | -4.845497E-05 | 1.832308E-05 | -2.391079E-06 | 0.000000E+00 | 0.000000E+00 |
| 31 | -2.588123E-04 | 6.478498E-05 | -6.645873E-06 | 0.000000E+00 | 0.000000E+00 |
| 32 | -9.869889E-05 | 2.853589E-05 | -3.424003E-06 | 0.000000E+00 | 0.000000E+00 |
| 41 | -1.375253E-03 | 3.271926E-04 | -3.825059E-05 | 9.945964E-07 | 8.500019E-08 |
| 42 | 7.029586E-04 | -1.067863E-04 | 1.046904E-05 | -6.611688E-07 | 2.196119E-08 |
| 51 | 1.765394E-03 | -2.736652E-04 | 2.589029E-05 | -1.365926E-06 | 3.087259E-08 |
| 52 | 7.612541E-04 | -1.003382E-04 | 8.320279E-06 | -3.997967E-07 | 8.524306E-09 |
| 61 | 5.824350E-05 | 5.444525E-06 | -1.429672E-06 | 1.090081E-07 | -3.041190E-09 |
| 62 | 2.813581E-04 | -4.294399E-05 | 4.190124E-06 | -2.311406E-07 | 5.402031E-09 |
| 71 | 1.399428E-04 | -1.577700E-05 | 1.165062E-06 | -5.020695E-08 | 9.468110E-10 |
| 72 | 7.888230E-06 | -4.010370E-07 | 1.120273E-08 | -1.383560E-10 | 2.330000E-13 |
| 81 | -5.772873E-06 | 3.363581E-07 | -1.287368E-08 | 2.895980E-10 | -2.864000E-12 |
| 82 | -1.567440E-06 | 4.665329E-08 | -5.234430E-10 | -4.077000E-12 | 1.070000E-13 |
| 91 | -2.996327E-06 | 1.321157E-07 | -3.536224E-09 | 5.210300E-11 | -3.240000E-13 |
| 92 | -7.475379E-07 | 2.273417E-08 | -4.376410E-10 | 4.831000E-12 | -2.300000E-14 |

FIG. 25

| Sixth embodiment | | | | | | |
|---|---|---|---|---|---|---|
| EFL=6.174 mm, HFOV=46.261°, TTL=9.278 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.461 | | | |
| First lens element 1 | Object-side surface 11 | 3.898 | 0.542 | 1.545 | 55.987 | 11.686 |
| | Image-side surface 12 | 9.520 | 0.050 | | | |
| Second lens element 2 | Object-side surface 21 | 5.472 | 0.217 | 1.671 | 19.243 | -2042.333 |
| | Image-side surface 22 | 5.363 | 0.491 | | | |
| Third lens element 3 | Object-side surface 31 | 9.895 | 0.652 | 1.545 | 55.987 | 21.776 |
| | Image-side surface 32 | 57.482 | 0.322 | | | |
| Fourth lens element 4 | Object-side surface 41 | -201.220 | 0.558 | 1.671 | 19.243 | -33.382 |
| | Image-side surface 42 | 25.510 | 0.071 | | | |
| Fifth lens element 5 | Object-side surface 51 | -100.049 | 0.892 | 1.640 | 23.529 | -155.649 |
| | Image-side surface 52 | -36000.000 | 0.060 | | | |
| Sixth lens element 6 | Object-side surface 61 | -36.439 | 0.896 | 1.545 | 55.987 | 24.486 |
| | Image-side surface 62 | -9.869 | 0.050 | | | |
| Seventh lens element 7 | Object-side surface 71 | 5.678 | 0.709 | 1.661 | 20.373 | -31.349 |
| | Image-side surface 72 | 4.242 | 0.104 | | | |
| Eighth lens element 8 | Object-side surface 81 | 4.292 | 0.890 | 1.545 | 55.987 | 6.741 |
| | Image-side surface 82 | -24.038 | 1.124 | | | |
| Ninth lens element 9 | Object-side surface 91 | -8.264 | 0.811 | 1.535 | 55.711 | -5.249 |
| | Image-side surface 92 | 4.428 | 0.500 | | | |
| Filter F | Object-side surface F1 | Infinity | 0.210 | 1.517 | 64.167 | |
| | Image-side surface F2 | Infinity | 0.127 | | | |
| | Image plane 99 | Infinity | | | | |

FIG. 28

| Surface | K | $a_4$ | $a_6$ | $a_8$ | $a_{10}$ |
|---|---|---|---|---|---|
| 11 | -1.873104E-01 | 2.405416E-04 | 2.259927E-03 | -2.568128E-03 | 1.723897E-03 |
| 12 | 0.000000E+00 | 4.031294E-04 | -4.828932E-03 | 5.793209E-03 | -3.185919E-03 |
| 21 | -1.850149E+00 | -1.836467E-03 | -9.397620E-03 | 1.029831E-02 | -6.357293E-03 |
| 22 | 3.190479E+00 | -5.313131E-03 | -7.153429E-03 | 5.931685E-03 | -3.528954E-03 |
| 31 | 0.000000E+00 | -2.266492E-03 | 1.225783E-03 | -3.073044E-03 | 1.932934E-03 |
| 32 | 0.000000E+00 | -7.399992E-03 | -1.501103E-03 | -7.300030E-04 | 5.435981E-04 |
| 41 | 0.000000E+00 | -2.150329E-02 | 6.407999E-03 | -1.353466E-02 | 1.271811E-02 |
| 42 | 0.000000E+00 | -8.343141E-03 | -7.507808E-03 | 3.541687E-03 | 1.076132E-03 |
| 51 | 0.000000E+00 | 1.583108E-03 | -1.011360E-02 | 7.533549E-03 | -1.815884E-03 |
| 52 | 0.000000E+00 | 1.118638E-02 | -2.876866E-02 | 2.434737E-02 | -1.207199E-02 |
| 61 | 0.000000E+00 | 2.235444E-02 | -3.235967E-02 | 2.465428E-02 | -1.144485E-02 |
| 62 | 0.000000E+00 | -3.588121E-02 | 2.267555E-02 | -1.398415E-02 | 6.189980E-03 |
| 71 | -1.002004E+02 | 7.945500E-03 | -1.472441E-02 | 7.025459E-03 | -1.997594E-03 |
| 72 | -8.097537E+00 | -3.848256E-03 | -6.353183E-03 | 2.630521E-03 | -4.963967E-04 |
| 81 | -2.265988E-01 | -3.725471E-03 | -4.366268E-03 | 1.600776E-03 | -3.547845E-04 |
| 82 | 0.000000E+00 | 1.591254E-02 | -9.005805E-04 | -3.071489E-04 | 5.699138E-05 |
| 91 | 4.399614E-01 | -9.414992E-03 | -4.015031E-03 | 1.702363E-03 | -2.581676E-04 |
| 92 | -4.245628E+00 | -5.335320E-03 | -8.317209E-04 | 2.472372E-04 | -2.702932E-05 |
| Surface | $a_{12}$ | $a_{14}$ | $a_{16}$ | $a_{18}$ | $a_{20}$ |
| 11 | -6.459181E-04 | 1.222358E-04 | -9.364641E-06 | 0.000000E+00 | 0.000000E+00 |
| 12 | 8.260660E-04 | -8.506703E-05 | 1.185971E-06 | 0.000000E+00 | 0.000000E+00 |
| 21 | 2.050551E-03 | -2.998488E-04 | 1.508545E-05 | 0.000000E+00 | 0.000000E+00 |
| 22 | 1.107055E-03 | -1.376311E-04 | 3.375222E-06 | 0.000000E+00 | 0.000000E+00 |
| 31 | -7.798212E-04 | 1.881675E-04 | -1.815077E-05 | 0.000000E+00 | 0.000000E+00 |
| 32 | -4.193991E-04 | 1.509942E-04 | -1.771044E-05 | 0.000000E+00 | 0.000000E+00 |
| 41 | -7.382566E-03 | 2.558261E-03 | -5.076234E-04 | 5.313149E-05 | -2.319012E-06 |
| 42 | -1.843839E-03 | 7.754763E-04 | -1.557298E-04 | 1.556187E-05 | -6.262935E-07 |
| 51 | -4.402331E-04 | 3.348355E-04 | -7.287058E-05 | 7.158949E-06 | -2.726056E-07 |
| 52 | 3.747850E-03 | -7.311065E-04 | 8.653756E-05 | -5.651049E-06 | 1.557959E-07 |
| 61 | 3.328769E-03 | -6.054789E-04 | 6.663874E-05 | -4.048358E-06 | 1.040245E-07 |
| 62 | -1.812507E-03 | 3.388492E-04 | -3.865089E-05 | 2.443883E-06 | -6.548106E-08 |
| 71 | 3.624179E-04 | -4.315627E-05 | 3.189142E-06 | -1.295603E-07 | 2.186064E-09 |
| 72 | 5.285356E-05 | -3.368516E-06 | 1.273797E-07 | -2.631485E-09 | 2.285100E-11 |
| 81 | 4.650166E-05 | -3.692341E-06 | 1.767669E-07 | -4.714560E-09 | 5.382300E-11 |
| 82 | -4.888269E-06 | 2.617893E-07 | -9.060881E-09 | 1.849480E-10 | -1.672000E-12 |
| 91 | 2.144565E-05 | -1.066631E-06 | 3.173715E-08 | -5.221430E-10 | 3.659000E-12 |
| 92 | 1.653213E-06 | -6.081986E-08 | 1.331145E-09 | -1.593800E-11 | 8.000000E-14 |

FIG. 29

| Seventh embodiment | | | | | | |
|---|---|---|---|---|---|---|
| EFL=6.099 mm, HFOV=46.817°, TTL=9.137 mm, Fno=1.600, ImgH=6.700 mm | | | | | | |
| Device | Surface | Radius of curvature (mm) | Distance (mm) | Refractive index | Abbe number | Focal length (mm) |
| Object | | Infinity | Infinity | | | |
| Aperture 0 | | Infinity | -0.491 | | | |
| First lens element 1 | Object-side surface 11 | 3.681 | 0.541 | 1.545 | 55.987 | 12.148 |
| | Image-side surface 12 | 7.836 | 0.050 | | | |
| Second lens element 2 | Object-side surface 21 | 5.160 | 0.216 | 1.671 | 19.243 | 129.531 |
| | Image-side surface 22 | 5.389 | 0.477 | | | |
| Third lens element 3 | Object-side surface 31 | 11.563 | 0.701 | 1.545 | 55.987 | 20.719 |
| | Image-side surface 32 | -522.652 | 0.243 | | | |
| Fourth lens element 4 | Object-side surface 41 | 465.591 | 0.485 | 1.671 | 19.243 | -7377.562 |
| | Image-side surface 42 | 425.741 | 0.148 | | | |
| Fifth lens element 5 | Object-side surface 51 | -15.391 | 0.887 | 1.640 | 23.529 | -18.998 |
| | Image-side surface 52 | 61.279 | 0.067 | | | |
| Sixth lens element 6 | Object-side surface 61 | -32.843 | 0.902 | 1.545 | 55.987 | 19.559 |
| | Image-side surface 62 | -8.140 | 0.050 | | | |
| Seventh lens element 7 | Object-side surface 71 | 5.433 | 0.729 | 1.661 | 20.373 | -31.107 |
| | Image-side surface 72 | 4.075 | 0.120 | | | |
| Eighth lens element 8 | Object-side surface 81 | 4.377 | 0.887 | 1.545 | 55.987 | 6.527 |
| | Image-side surface 82 | -17.858 | 1.077 | | | |
| Ninth lens element 9 | Object-side surface 91 | -8.246 | 0.745 | 1.535 | 55.711 | -5.169 |
| | Image-side surface 92 | 4.319 | 0.500 | | | |
| Filter F | Object-side surface F1 | Infinity | 0.210 | 1.517 | 64.167 | |
| | Image-side surface F2 | Infinity | 0.102 | | | |
| | Image plane 99 | Infinity | | | | |

FIG. 32

| Surface | K | $a_4$ | $a_6$ | $a_8$ | $a_{10}$ |
|---|---|---|---|---|---|
| 11 | -1.033102E-01 | 5.128260E-04 | 2.709236E-03 | -3.007060E-03 | 1.965624E-03 |
| 12 | 0.000000E+00 | 1.882638E-03 | -8.354079E-03 | 8.869707E-03 | -4.849794E-03 |
| 21 | -2.035119E+00 | -3.743740E-04 | -1.215714E-02 | 1.182133E-02 | -6.851346E-03 |
| 22 | 2.971755E+00 | -4.565717E-03 | -8.276888E-03 | 6.550179E-03 | -3.786770E-03 |
| 31 | 0.000000E+00 | -3.315155E-03 | 1.376470E-03 | -3.415961E-03 | 2.369634E-03 |
| 32 | 0.000000E+00 | -8.440391E-03 | -5.902617E-03 | 5.091329E-03 | -3.707457E-03 |
| 41 | 0.000000E+00 | -2.125699E-02 | 1.251293E-02 | -2.591254E-02 | 2.463533E-02 |
| 42 | 0.000000E+00 | -9.077228E-03 | 9.563497E-03 | -1.612645E-02 | 1.334269E-02 |
| 51 | -2.981696E+01 | -1.012096E-02 | 1.638298E-02 | -2.131240E-02 | 1.645582E-02 |
| 52 | 0.000000E+00 | -1.410681E-02 | 1.972832E-02 | -2.008482E-02 | 1.048008E-02 |
| 61 | 0.000000E+00 | -3.380040E-03 | 2.047518E-02 | -2.354618E-02 | 1.250682E-02 |
| 62 | 0.000000E+00 | -5.125876E-03 | -1.590248E-02 | 1.065253E-02 | -3.790604E-03 |
| 71 | -3.112025E+01 | 1.145187E-02 | -2.139746E-02 | 1.050349E-02 | -3.003323E-03 |
| 72 | -6.032820E+00 | -1.516280E-04 | -9.115425E-03 | 3.700307E-03 | -7.585572E-04 |
| 81 | -2.330398E-01 | -5.699444E-03 | -2.899990E-03 | 1.183307E-03 | -2.857185E-04 |
| 82 | 0.000000E+00 | 1.551676E-02 | -4.876464E-04 | -4.719081E-04 | 8.900292E-05 |
| 91 | 6.998989E-01 | -1.013184E-02 | -2.886412E-03 | 1.285433E-03 | -1.898472E-04 |
| 92 | -4.201823E+00 | -6.625795E-03 | -4.133087E-04 | 1.755423E-04 | -1.982432E-05 |
| Surface | $a_{12}$ | $a_{14}$ | $a_{16}$ | $a_{18}$ | $a_{20}$ |
| 11 | -7.335375E-04 | 1.436620E-04 | -1.181559E-05 | 0.000000E+00 | 0.000000E+00 |
| 12 | 1.392306E-03 | -1.827120E-04 | 7.127769E-06 | 0.000000E+00 | 0.000000E+00 |
| 21 | 2.198149E-03 | -3.302303E-04 | 1.748834E-05 | 0.000000E+00 | 0.000000E+00 |
| 22 | 1.217770E-03 | -1.693453E-04 | 6.746992E-06 | 0.000000E+00 | 0.000000E+00 |
| 31 | -9.628856E-04 | 2.247083E-04 | -2.131796E-05 | 0.000000E+00 | 0.000000E+00 |
| 32 | 1.519160E-03 | -3.526342E-04 | 4.929750E-05 | -3.505898E-06 | -1.923134E-08 |
| 41 | -1.435772E-02 | 5.123838E-03 | -1.080541E-03 | 1.227597E-04 | -5.771702E-06 |
| 42 | -6.503990E-03 | 1.878807E-03 | -3.155812E-04 | 2.861700E-05 | -1.086069E-06 |
| 51 | -7.565084E-03 | 2.067685E-03 | -3.284602E-04 | 2.804974E-05 | -9.981087E-07 |
| 52 | -3.146423E-03 | 5.665717E-04 | -6.020848E-05 | 3.470424E-06 | -8.332961E-08 |
| 61 | -3.755065E-03 | 6.757651E-04 | -7.239419E-05 | 4.269914E-06 | -1.071532E-07 |
| 62 | 8.783467E-04 | -1.359722E-04 | 1.341333E-05 | -7.514514E-07 | 1.807807E-08 |
| 71 | 5.591120E-04 | -7.105852E-05 | 5.979921E-06 | -2.993476E-07 | 6.717298E-09 |
| 72 | 9.268770E-05 | -7.076055E-06 | 3.326253E-07 | -8.835213E-09 | 1.017490E-10 |
| 81 | 3.944603E-05 | -3.230302E-06 | 1.569535E-07 | -4.189974E-09 | 4.734100E-11 |
| 82 | -8.495677E-06 | 5.069839E-07 | -1.891756E-08 | 4.000150E-10 | -3.631000E-12 |
| 91 | 1.517833E-05 | -7.200645E-07 | 2.020315E-08 | -3.083760E-10 | 1.957000E-12 |
| 92 | 1.211073E-06 | -4.409964E-08 | 9.526170E-10 | -1.125400E-11 | 5.600000E-14 |

FIG. 33

| Condition | First embodiment | Second embodiment | Third embodiment | Fourth embodiment | Fifth embodiment |
|---|---|---|---|---|---|
| ALT/Tavg2345 | 12.535 | 13.105 | 15.213 | 15.151 | 11.584 |
| V2+V3+V4 | 94.473 | 94.473 | 94.473 | 117.049 | 94.473 |
| TTL/EFL | 1.701 | 1.291 | 1.306 | 1.278 | 1.482 |
| TL/(EFL+BFL) | 1.299 | 1.019 | 1.047 | 1.050 | 1.224 |
| Tmax/Tmin | 4.099 | 3.094 | 4.104 | 3.951 | 2.503 |
| (T4+G45+T5+G56)/T6 | 0.871 | 1.655 | 1.999 | 1.110 | 1.312 |
| AAG/(G23+G34+G89) | 1.286 | 1.446 | 2.289 | 1.407 | 1.255 |
| V4+V5+V6 | 98.759 | 98.759 | 98.759 | 117.049 | 98.759 |
| TTL/(G23+Tmax) | 5.135 | 5.615 | 5.994 | 5.379 | 6.697 |
| ALT/EFL | 0.999 | 0.745 | 0.720 | 0.725 | 0.981 |
| T1/Tmin | 2.501 | 3.094 | 4.104 | 3.951 | 2.503 |
| (T6+T7+T8+T9)/Tavg2345 | 6.682 | 6.169 | 7.944 | 7.758 | 5.701 |
| (G45+G56+G67+G78)/T9 | 1.799 | 1.491 | 1.799 | 1.799 | 1.104 |
| (V3+V4+V5)/V9 | 1.773 | 1.773 | 1.773 | 2.352 | 1.773 |
| TL/(G89+Tmax) | 3.290 | 3.504 | 4.699 | 3.561 | 4.241 |
| AAG/(T1+BFL) | 1.635 | 1.363 | 1.635 | 1.617 | 1.395 |
| T6/T4 | 2.903 | 1.753 | 2.241 | 3.156 | 1.603 |
| (T6+T8)/T7 | 7.006 | 3.059 | 2.002 | 3.436 | 3.185 |
| (G23+T3+G34)/(G12+T2) | 3.662 | 2.703 | 2.949 | 3.840 | 3.434 |
| (G23+T3+G34+G78+T8+G89)/(G12+T2) | 10.177 | 7.401 | 7.401 | 9.399 | 8.026 |
| (G23+T3+G34+G78)/(G12+T2) | 4.658 | 3.304 | 4.502 | 4.337 | 3.659 |

FIG. 34

| Condition | Sixth embod-iment | Seventh embod-iment |
|---|---|---|
| ALT/Tavg2345 | 10.636 | 10.647 |
| V2+V3+V4 | 94.473 | 94.473 |
| TTL/EFL | 1.503 | 1.498 |
| TL/(EFL+BFL) | 1.204 | 1.204 |
| Tmax/Tmin | 4.131 | 4.170 |
| (T4+G45+T5+G56)/T6 | 1.766 | 1.758 |
| AAG/(G23+G34+G89) | 1.173 | 1.242 |
| V4+V5+V6 | 98.759 | 98.759 |
| TTL/(G23+Tmax) | 6.692 | 6.623 |
| ALT/EFL | 0.999 | 0.999 |
| T1/Tmin | 2.501 | 2.501 |
| (T6+T7+T8+T9)/Tavg2345 | 5.701 | 5.701 |
| (G45+G56+G67+G78)/T9 | 0.353 | 0.516 |
| (V3+V4+V5)/V9 | 1.773 | 1.773 |
| TL/(G89+Tmax) | 4.179 | 4.205 |
| AAG/(T1+BFL) | 1.649 | 1.649 |
| T6/T4 | 1.605 | 1.862 |
| (T6+T8)/T7 | 2.518 | 2.455 |
| (G23+T3+G34)/(G12+T2) | 5.492 | 5.336 |
| (G23+T3+G34+G78+T8+G89)/(G12+T2) | 13.433 | 13.157 |
| (G23+T3+G34+G78)/(G12+T2) | 5.883 | 5.785 |

FIG. 35

OPTICAL IMAGING LENS

CROSS-REFERENCE TO RELATED APPLICATION

This application claims the priority benefit of China application serial no. 202210032760.5, filed on Jan. 12, 2022. The entirety of the above-mentioned patent application is hereby incorporated by reference herein and made a part of this specification.

BACKGROUND

Technical Field

The disclosure relates to an optical element, particularly to an optical imaging lens.

Description of Related Art

In recent years, optical imaging lenses have been evolving continuously to have a wider range of applications. In addition to providing compact and slim lenses, it is also important to improve the design of a small f-number (Fno) conducive to increasing the luminous flux, and a large field of view also gradually becomes the market trend. Furthermore, the image height of the lens also needs to be increased to improve the image quality and resolution. A larger image sensor is adopted to receive imaging rays to meet the high image quality requirements. Therefore, it has become a challenge and problem to be solved to design compact and slim optical imaging lenses with good imaging quality that have a small Fno and a large image height.

SUMMARY

The disclosure provides an optical imaging lens with small Fno, a large image height, and excellent imaging quality.

An embodiment of the present disclosure provides an optical imaging lens, including a first lens element, a second lens element, a third lens element, a fourth lens element, a fifth lens element, a sixth lens element, a seventh lens element, an eighth lens element, and a ninth lens element arranged in sequence from an object side to an image side along an optical axis. Each of the first lens element to the ninth lens element includes an object-side surface facing the object side and allowing imaging rays to pass through, and an image-side surface facing the image side and allowing the imaging rays to pass through. The first lens element has positive refracting power. The periphery region of the image-side surface of the third lens element is convex. The periphery region of the object-side surface of the fifth lens element is convex. The sixth lens element has positive refracting power. The periphery region of the image-side surface of the seventh lens element is convex. Lens elements of the optical imaging lens are only the nine lens elements described above, and the optical imaging lens satisfies: $ALT/Tavg2345 \geq 10.000$, in which ALT is a sum of thicknesses of nine lens elements from the first lens element to the ninth lens element on the optical axis, and Tavg2345 is an average of thicknesses of four lens elements from the second lens element to the fifth lens element on the optical axis.

An embodiment of the present disclosure provides an optical imaging lens, including a first lens element, a second lens element, a third lens element, a fourth lens element, a fifth lens element, a sixth lens element, a seventh lens element, an eighth lens element, and a ninth lens element arranged in sequence from an object side to an image side along an optical axis. Each of the first lens element to the ninth lens element includes an object-side surface facing the object side and allowing imaging rays to pass through, and an image-side surface facing the image side and allowing the imaging rays to pass through. The first lens element has positive refracting power, and the periphery region of the object-side surface of the first lens element is convex. The optical axis region of the image-side surface of the third lens element is convex. The periphery region of the image-side surface of the fourth lens element is convex. The optical axis region of the image-side surface of the sixth lens element is convex. The optical axis region of the image-side surface of the seventh lens element is concave. Lens elements of the optical imaging lens are only the nine lens elements described above, and the optical imaging lens satisfies: $ALT/Tavg2345 \geq 10.000$, in which ALT is a sum of thicknesses of nine lens elements from the first lens element to the ninth lens element on the optical axis, and Tavg2345 is an average of thicknesses of four lens elements from the second lens element to the fifth lens element on the optical axis.

An embodiment of the present disclosure provides an optical imaging lens, including a first lens element, a second lens element, a third lens element, a fourth lens element, a fifth lens element, a sixth lens element, a seventh lens element, an eighth lens element, and a ninth lens element arranged in sequence from an object side to an image side along an optical axis. Each of the first lens element to the ninth lens element includes an object-side surface facing the object side and allowing imaging rays to pass through, and an image-side surface facing the image side and allowing the imaging rays to pass through. The first lens element has positive refracting power. The periphery region of the image-side surface of the second lens element is concave. The optical axis region of the image-side surface of the third lens element is convex. The periphery region of the image-side surface of the fourth lens element is convex. The optical axis region of the image-side surface of the seventh lens element is concave. The optical axis region of the image-side surface of the ninth lens element is concave. Lens elements of the optical imaging lens are only the nine lens elements described above, and the optical imaging lens satisfies: $ALT/Tavg2345 \geq 10.000$, in which ALT is a sum of thicknesses of nine lens elements from the first lens element to the ninth lens element on the optical axis, and Tavg2345 is an average of thicknesses of four lens elements from the second lens element to the fifth lens element on the optical axis.

In view of the above, the optical imaging lens provided in one or more embodiments is advantageous because of the following: by satisfying the aforementioned concave-convex curved surface arrangement design, refracting power conditions, and the above-mentioned conditional expressions, the optical imaging lens has a small Fno and a larger image height while maintaining the imaging quality.

In order to make the aforementioned and other features and advantages comprehensible, several exemplary embodiments accompanied with figures are described in detail below.

BRIEF DESCRIPTION OF THE DRAWING

The accompanying drawings are included to provide a further understanding of the disclosure, and are incorporated in and constitute a part of this specification. The drawings illustrate embodiments of the disclosure and, together with the description, serve to explain the principles described herein.

FIG. 8 shows detailed optical data of the optical imaging lens according to the first embodiment of the disclosure.

FIG. 9 shows aspheric parameters of the optical imaging lens according to the first embodiment of the disclosure.

FIG. 12 shows detailed optical data of the optical imaging lens according to the second embodiment of the disclosure.

FIG. 13 shows aspheric parameters of the optical imaging lens according to the second embodiment of the disclosure.

FIG. 16 shows detailed optical data of the optical imaging lens according to the third embodiment of the disclosure.

FIG. 17 shows aspheric parameters of the optical imaging lens according to the third embodiment of the disclosure.

FIG. 20 shows detailed optical data of the optical imaging lens according to the fourth embodiment of the disclosure.

FIG. 21 shows aspheric parameters of the optical imaging lens according to the fourth embodiment of the disclosure.

FIG. 24 shows detailed optical data of the optical imaging lens according to the fifth embodiment of the disclosure.

FIG. 25 shows aspheric parameters of the optical imaging lens according to the fifth embodiment of the disclosure.

FIG. 28 shows detailed optical data of the optical imaging lens according to the sixth embodiment of the disclosure.

FIG. 29 shows aspheric parameters of the optical imaging lens according to the sixth embodiment of the disclosure.

FIG. 32 shows detailed optical data of the optical imaging lens according to the seventh embodiment of the present disclosure.

FIG. 33 shows the aspheric parameters of the optical imaging lens according to the seventh embodiment of the present disclosure.

FIG. 34 to FIG. 35 show the important parameters of the optical imaging lenses according to the first embodiment to the seventh embodiment of the disclosure and the numerical values of their relational expressions.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
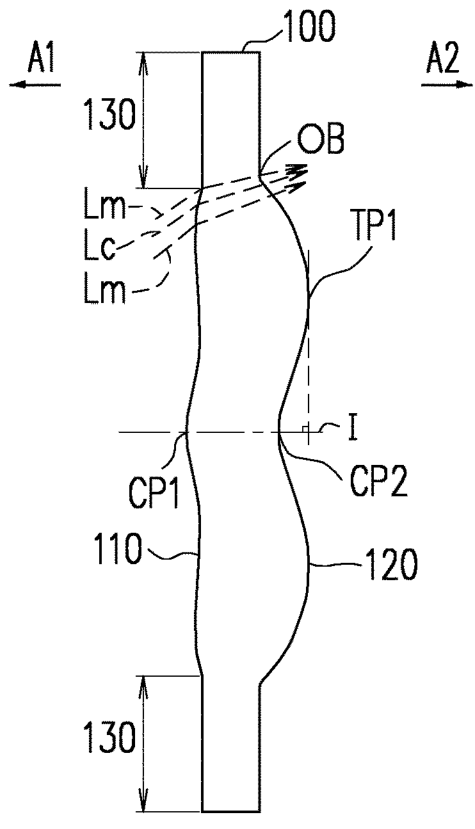
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
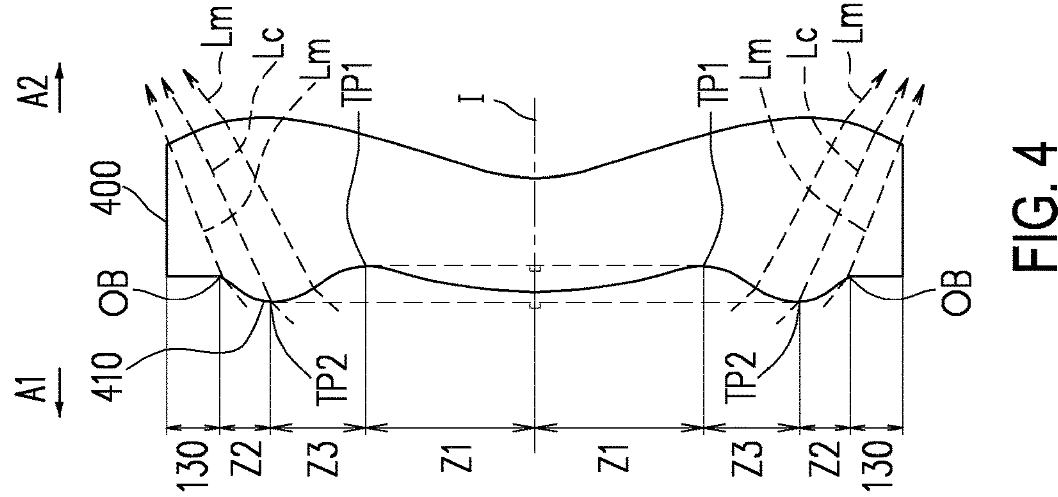
FIG. 4 is a schematic diagram illustrating a surface shape structure of a lens element according to Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
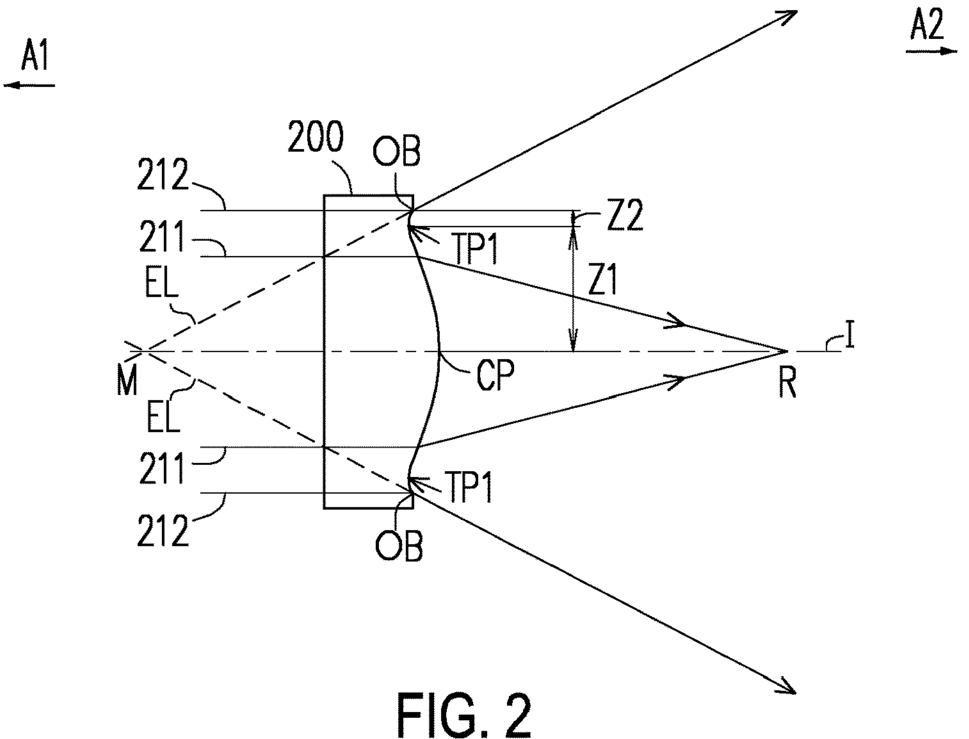
FIG. 2 is a schematic diagram illustrating concave and convex surface shape structures and a light focal point of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
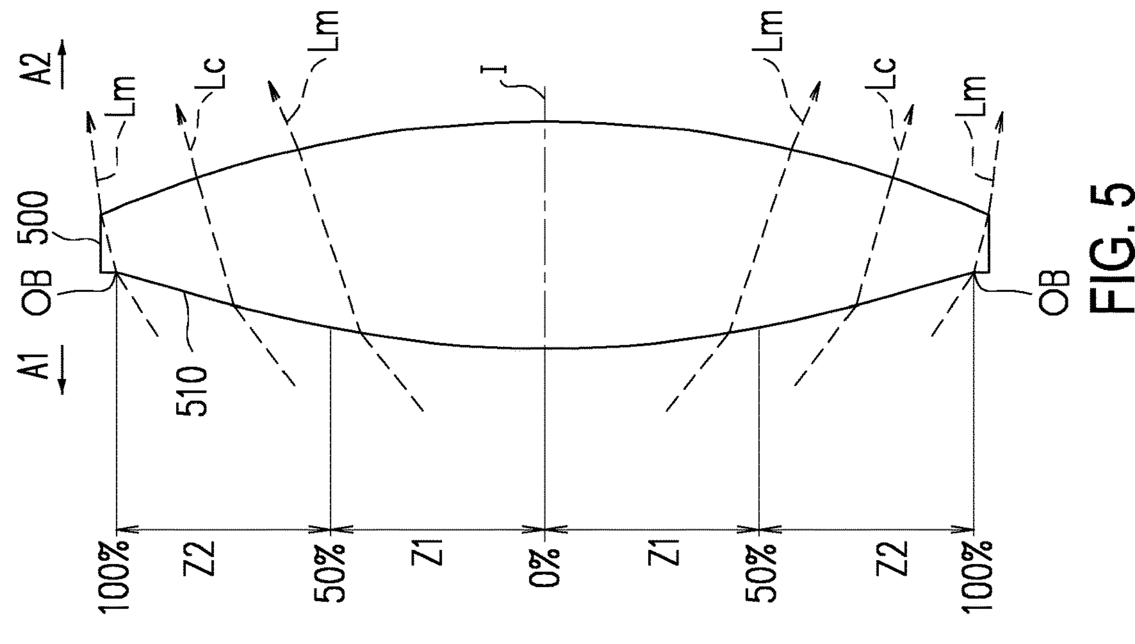
FIG. 5 is a schematic diagram illustrating a surface shape structure of a lens element according to Example 3.
Figure 3:
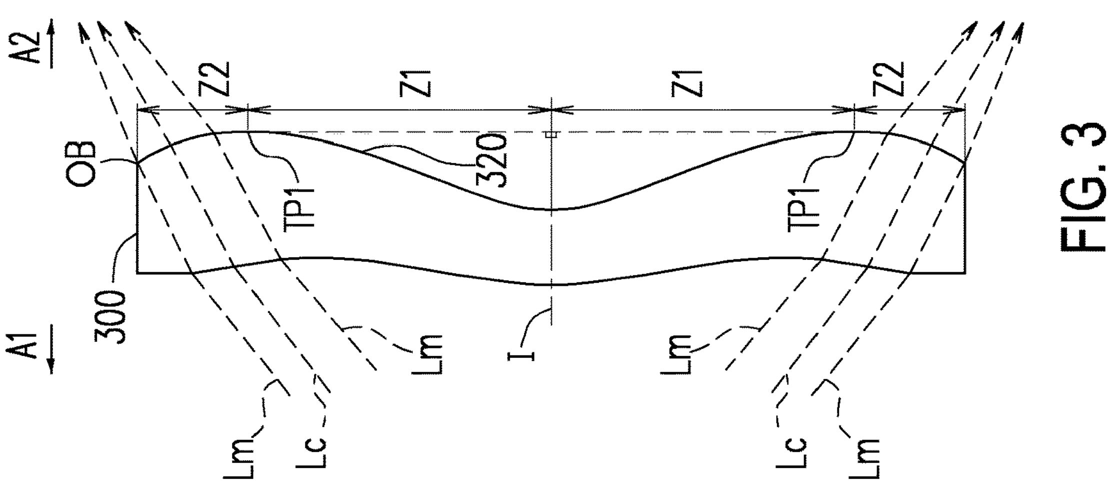
FIG. 3 is a schematic diagram illustrating a surface shape structure of a lens element according to Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
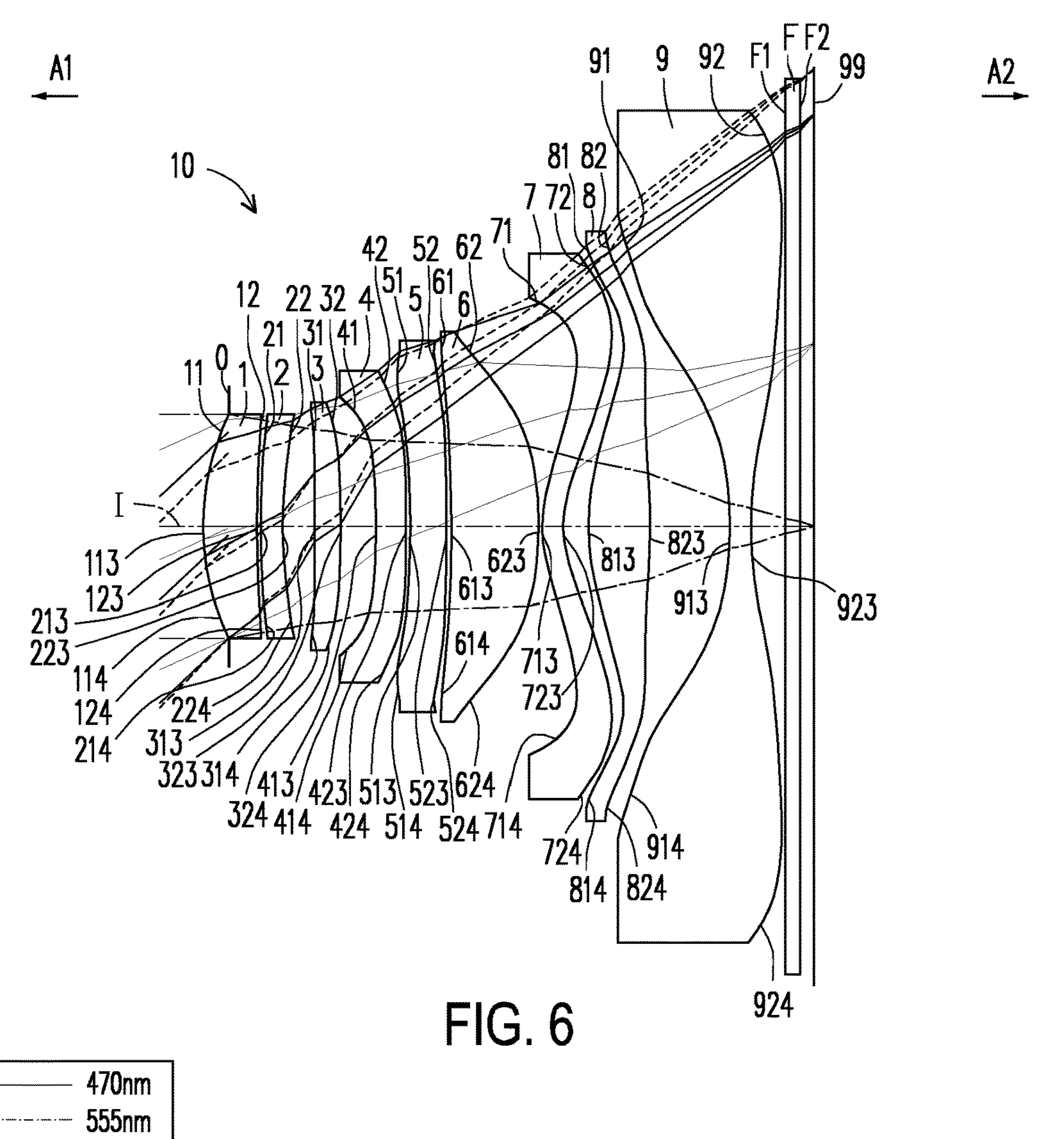
FIG. 6 is a schematic diagram illustrating an optical imaging lens according to a first embodiment of the disclosure.

FIG. 6 is a schematic diagram of the optical imaging lens according to the first embodiment of the present disclosure, and FIG. 7A to FIG. 7D are diagrams illustrating a longitudinal spherical aberration and various aberrations of the optical imaging lens according to the first embodiment. With reference to FIG. 6, the optical imaging lens 10 provided in the first embodiment of the disclosure includes a first lens element 1, a second lens element 2, a third lens element 3, a fourth lens element 4, a fifth lens element 5, a sixth lens element 6, a seventh lens element 7, an eighth lens element 8, a ninth lens element 9, and a filter F arranged in sequence from the object side A1 to the image side A2 along an optical axis I of the optical imaging lens 10, wherein an apertures 0 is disposed on the side of the first lens element 1 facing the object side A1. When rays emitted from an object to be shot enters the optical imaging lens 10, a clear image may be formed on an image plane 99 after the rays sequentially pass through the aperture 0, the first lens element 1, the second lens element 2, the third lens element 3, the fourth lens element 4, the fifth lens element 5, the sixth lens element 6, the seventh lens element 7, the eighth lens element 8, the ninth lens element 9, and the filter F. The filter F is disposed between an image-side surface 92 of the ninth lens element 9 and the image plane 99. In addition, the object side A1 is a side facing the object to be shot, whereas the image side A2 is a side facing the image plane 99. In one embodiment, the filter F is an IR-cut filter, but the invention is not limited thereto.

In the present embodiment, the first lens element 1, the second lens element 2, the third lens element 3, the fourth lens element 4, the fifth lens element 5, the sixth lens element 6, the seventh lens element 7, the eighth lens element 8, the ninth lens element 9, and the filters F respectively have object-side surfaces 11, 21, 31, 41, 51, 61, 71, 81, 91, and F1 facing the object side A1 and allowing imaging rays to pass through, and image-side surfaces 12, 22, 32, 42, 52, 62, 72, 82, 92, and F2 facing the image side A2 and allowing the imaging rays to pass through.

The first lens element 1 has positive refracting power. The first lens element 1 is made of plastic, but the invention is not limited thereto. The optical axis region 113 of the object-side surface 11 of the first lens element 1 is convex, and the periphery region 114 thereof is convex. The optical axis region 123 of the image-side surface 12 of the first lens element 1 is concave, and the periphery region 124 thereof is concave. In the present embodiment, both the object-side surface 11 and the image-side surface 12 of the first lens element 1 are aspheric surfaces, but the invention is not limited thereto.

The second lens element 2 has negative refracting power. The second lens element 2 is made of plastic, but the invention is not limited thereto. The optical axis region 213 of the object-side surface 21 of the second lens element 2 is convex, and the periphery region 214 thereof is convex. The optical axis region 223 of the image-side surface 22 of the second lens element 2 is concave, and the periphery region 224 thereof is concave. In the present embodiment, both the object-side surface 21 and the image-side surface 22 of the second lens element 2 are aspherical surfaces, but the present disclosure is not limited thereto.

The third lens element 3 has positive refracting power. The third lens element 3 is made of plastic, but the invention is not limited thereto. The optical axis region 313 of the object-side surface 31 of the third lens element 3 is convex, and the periphery region 314 thereof is concave. The optical axis region 323 of the image-side surface 32 of the third lens element 3 is convex, and the periphery region 324 thereof is convex. In the present embodiment, both the object-side surface 31 and the image-side surface 32 of the third lens element 3 are aspherical surfaces, but the present disclosure is not limited thereto.

The fourth lens element 4 has negative refracting power. The fourth lens element 4 is made of plastic, but the invention is not limited thereto. The optical axis region 413 of the object-side surface 41 of the fourth lens element 4 is concave, and the periphery region 414 thereof is concave. The optical axis region 423 of the image-side surface 42 of the fourth lens element 4 is convex, and the periphery region 424 thereof is convex. In the present embodiment, both the object-side surface 41 and the image-side surface 42 of the fourth lens element 4 are aspherical surfaces, but the present disclosure is not limited thereto.

The fifth lens element 5 has negative refracting power. The fifth lens element 5 is made of plastic, but the invention is not limited thereto. The optical axis region 513 of the object-side surface 51 of the fifth lens element 5 is concave, and the periphery region 514 thereof is convex. The optical axis region 523 of the image-side surface 52 of the fifth lens element 5 is convex, and the periphery region 524 thereof is concave. In the present embodiment, both the object-side surface 51 and the image-side surface 52 of the fifth lens element 5 are aspherical surfaces, but the present disclosure is not limited thereto.

The sixth lens element 6 has positive refracting power. The sixth lens element 6 is made of plastic, but the invention is not limited thereto. The optical axis region 613 of the object-side surface 61 of the sixth lens element 6 is concave, and the periphery region 614 thereof is concave. The optical axis region 623 of the image-side surface 62 of the sixth lens element 6 is convex, and the periphery region 624 thereof is convex. In the present embodiment, both the object-side surface 61 and the image-side surface 62 of the sixth lens element 6 are aspherical surfaces, but the present disclosure is not limited thereto.

The seventh lens element 7 has negative refracting power. The seventh lens element 7 is made of plastic, but the invention is not limited thereto. The optical axis region 713 of the object-side surface 71 of the seventh lens element 7 is convex, and the periphery region 714 thereof is concave. The optical axis region 723 of the image-side surface 72 of the seventh lens element 7 is concave, and the periphery region 724 thereof is convex. In the present embodiment, both the object-side surface 71 and the image-side surface 72 of the seventh lens element 7 are aspherical surfaces, but the present disclosure is not limited thereto.

The eighth lens element 8 has positive refracting power. The eighth lens element 8 is made of plastic, but the present disclosure is not limited thereto. The optical axis region 813 of the object-side surface 81 of the eighth lens element 8 is convex, and the periphery region 814 thereof is concave. The optical axis region 823 of the image-side surface 82 of the eighth lens element 8 is convex, and the periphery region 824 thereof is convex. In the present embodiment, both the object-side surface 81 and the image-side surface 82 of the eighth lens element 8 are aspherical surfaces, but the present disclosure is not limited thereto.

The ninth lens element 9 has negative refracting power. The ninth lens element 9 is made of plastic, but the present disclosure is not limited thereto. The optical axis region 913 of the object-side surface 91 of the ninth lens element 9 is concave, and the periphery region 914 thereof is concave. The optical axis region 923 of the image-side surface 92 of the ninth lens element 9 is concave, and the periphery region 924 thereof is convex. In the present embodiment, both the object-side surface 91 and the image-side surface 92 of the ninth lens element 9 are aspherical surfaces, but the present disclosure is not limited thereto.

In the present embodiment, the optical imaging lens 10 only has the above-mentioned nine lenses.

Other detailed optical data of the first embodiment are as shown in FIG. 8. In addition, the effective focal length (EFL) of the optical imaging lens 10 of the first embodiment is 5.249 mm, the half field of view (HFOV) thereof is 45.360°, the F-number (Fno) thereof is 1.600, its system length thereof is 8.927 mm, and the image height (ImgH) thereof is 6.700 mm, wherein the system length refers to the distance from the object-side surface 11 of the first lens element 1 to the image plane 99 on the optical axis I.

Furthermore, in the present embodiment, the object-side surfaces 11, 21, 31, 41, 51, 61, 71, 81, and 91 and the image-side surfaces 12, 22, 32, 42, 52, 62, 72, 82, and 92 of the first lens element 1, the second lens element 2, the third lens element 3, the fourth lens element 4, the fifth lens element 5, the sixth lens element 6, the seventh lens element 7, the eighth lens element 8, and the ninth lens element 9 are all aspherical surfaces in total, wherein the object-side surfaces 11, 21, 31, 41, 51, 61, 71, 81, 91 and the image-side surfaces 12, 22, 32, 42, 52, 62, 72, 82, 92 are all even aspherical surfaces. And these aspheric surfaces are defined according to the following formula:

$$Z(Y) = \frac{Y_2}{R} \Bigg/ \left(1 + \sqrt{1 - (1+K)\frac{Y^2}{R^2}}\right) + \sum_{i=1}^{n} a_i \times Y^i \quad (1)$$

Here,

R: a radius of curvature of the lens surface near the optical axis I;

Z: a depth of the aspheric surface (a vertical distance between a point on the aspheric surface that is spaced by the distance Y from the optical axis and a tangent plane tangent to a vertex of the aspheric surface on the optical axis);

Y: a distance from a point on the aspheric curve and the optical axis I;

K: a conic constant;

$a_i$: the i-th order aspheric coefficient.

Respective aspherical coefficients of the object-side surface 11 of the first lens element 1 to the image-side surface 92 of the ninth lens element 9 in the formula (1) are as shown in FIG. 9. Here, the row number 11 in FIG. 9 represents aspheric coefficient of the object-side surface 11 of the first lens element 1, and other rows are arranged based on the same principle. The second-order aspheric coefficient $a_2$ in the present embodiment and the following embodiments is all zero.

In addition, relations of the important parameters in the optical imaging lens 10 according to the first embodiment are as shown in FIG. 34.

Here,

T1 is a thickness of the first lens element 1 on the optical axis I;

T2 is a thickness of the second lens element 2 on the optical axis I;

T3 is a thickness of the third lens element 3 on the optical axis I;

T4 is a thickness of the fourth lens element 4 on the optical axis I;

T5 is a thickness of the fifth lens element 5 on the optical axis I;

T6 is a thickness of the sixth lens element 6 on the optical axis I;

T7 is a thickness of the seventh lens element 7 on the optical axis I;

T8 is a thickness of the eighth lens element 8 on the optical axis I;

T9 is a thickness of the ninth lens element 9 on the optical axis I;

TF is a thickness of the filter F on the optical axis I;

G12 is an air gap between the first lens element 1 and the second lens element 2 on the optical axis I, i.e., a distance from the image-side surface 12 of the first lens element 1 to the object-side surface 21 of the second lens element 2 on the optical axis I;

G23 is an air gap between the second lens element 2 and the third lens element 3 on the optical axis I, i.e., a distance from the image-side surface 22 of the second lens element 2 to the object-side surface 31 of the third lens element 3 on the optical axis I;

G34 is an air gap between the third lens element 3 and the fourth lens element 4 on the optical axis I, i.e., a distance from the image-side surface 32 of the third lens element 3 to the object-side surface 41 of the fourth lens element 4 on the optical axis I;

G45 is an air gap between the fourth lens element 4 and the fifth lens element 5 on the optical axis I, i.e., a distance from the image-side surface 42 of the fourth lens element 4 to the object-side surface 51 of the fifth lens element 5 on the optical axis I;

G56 is an air gap between the fifth lens element 5 and the sixth lens element 6 on the optical axis I, i.e., a distance from the image-side surface 52 of the fifth lens element 5 to the object-side surface 61 of the sixth lens element 6 on the optical axis I;

G67 is an air gap between the sixth lens element 6 and the seventh lens element 7 on the optical axis I, i.e., a distance from the image-side surface 62 of the sixth lens element 6 to the object-side surface 71 of the seventh lens element 7 on the optical axis I;

G78 is an air gap between the seventh lens element 7 and the eighth lens element 8 on the optical axis I, i.e., a distance from the image-side surface 72 of the seventh lens element 7 to the object-side surface 81 of the eighth lens element 8 on the optical axis I;

G89 is an air gap between the eighth lens element 8 and the ninth lens element 9 on the optical axis I, i.e., a distance from the image-side surface 82 of the eighth lens element 8 to the object-side surface 91 of the ninth lens element 9 on the optical axis I;

G9F is an air gap between the ninth lens element 9 and the filter F on the optical axis I, i.e., a distance from the image-side surface 92 of the ninth lens element 9 to the object side F1 of the filter F on the optical axis I;

GFP is an air gap between the optical filter F and the image plane 99 on the optical axis I, i.e., a distance from the image-side surface F2 of the optical filter F to the image plane 99 on the optical axis I;

AAG is a sum of the eight air gaps from the first lens element 1 to the ninth lens element 9 on the optical axis I, i.e., a sum of the air gaps G12, G23, G34, G45, G56, G67, G78, and G89;

ALT is a sum of thicknesses of nine lens elements from the first lens element 1 to the ninth lens element 9 on the optical axis I, i.e., a sum of the thicknesses T1, T2, T3, T4, T5, T6, T7, T8, and T9;

Tmin is a minimum thickness of nine lens elements from the first lens element 1 to the ninth lens element 9 on the optical axis I, i.e., the minimum thickness among the thicknesses T1, T2, T3, T4, T5, T6, T7, T8, and T9;

Tmax is a maximum thickness of nine lens elements from the first lens element 1 to the ninth lens element 9 on the optical axis I, i.e., the maximum thickness among the thicknesses T1, T2, T3, T4, T5, T6, T7, T8, and T9;

Tavg2345 is an average of the thicknesses of four lens elements from the second lens element 2 to the fifth lens element 5 on the optical axis I, i.e., an average value of the thicknesses T2, T3, T4, and T5;

TL is a distance from the object-side surface 11 of the first lens element 1 to the image-side surface 92 of the ninth lens element 9 on the optical axis I;

TTL is a distance from the object-side surface 11 of the first lens element 1 to the image plane 99 on the optical axis I;

BFL is a distance from the image-side surface 92 of the ninth lens element 9 to the image plane 99 on the optical axis I, i.e., a sum of G9F, TF, and GFP;

EFL is an effective focal length of the optical imaging lens 10;

HFOV is the half field of view of the optical imaging lens 10;

ImgH is an image height of the optical imaging lens 10; and

Fno is an f-number of the optical imaging lens 10.

Also, other definitions are provided below:

f1 is a focal length of the first lens element 1;

f2 is a focal length of the second lens element 2;

f3 is a focal length of the third lens element 3;

f4 is a focal length of the fourth lens element 4;

f5 is a focal length of the fifth lens element 5;

f6 is a focal length of the sixth lens element 6;

f7 is a focal length of the seventh lens element 7;

f8 is a focal length of the eighth lens element 8;

f9 is a focal length of the ninth lens element 9;

n1 is a refractive index of the first lens element 1;

n2 is a refractive index of the second lens element 2;

n3 is a refractive index of the third lens element 3;

n4 is a refractive index of the fourth lens element 4;

n5 is a refractive index of the fifth lens element 5;

n6 is a refractive index of the sixth lens element 6;

n7 is a refractive index of the seventh lens element 7;

n8 is a refractive index of the eighth lens element 8;

n9 is a refractive index of the ninth lens element 9;

V1 is an Abbe number, which is called the chromatic dispersion coefficient, of the first lens element 1;

V2 is an Abbe number of the second lens element 2;

V3 is an Abbe number of the third lens element 3;

V4 is an Abbe number of the fourth lens element 4;

V5 is an Abbe number of the fifth lens element 5;

V6 is an Abbe number of the sixth lens element 6;

V7 is an Abbe number of the seventh lens element 7;

V8 is an Abbe number of the eighth lens element 8; and

V9 is an Abbe number of the ninth lens element 9.

Figures 7A, 7B, 7C, 7D:
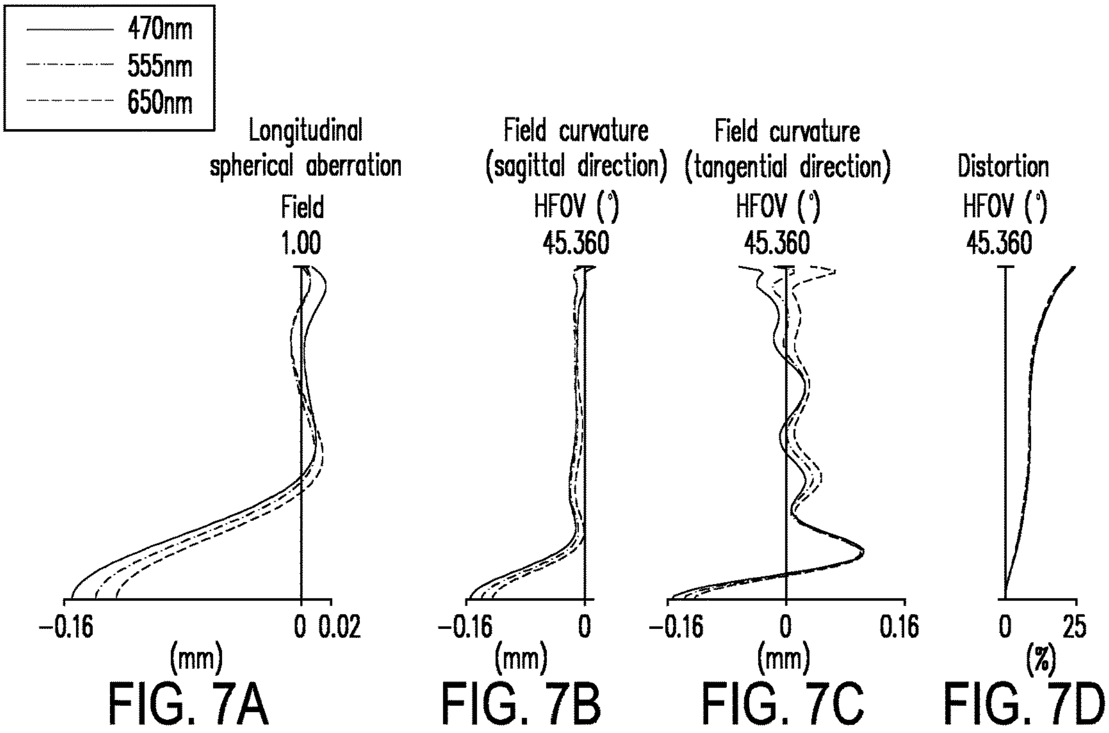
FIG. 7A to FIG. 7D are diagrams illustrating a longitudinal spherical aberration and various aberrations of the optical imaging lens according to the first embodiment.

With reference to FIG. 7A to FIG. 7D, the longitudinal spherical aberration provided in the first embodiment is depicted in FIG. 7A, whereas FIG. 7B and FIG. 7C respectively illustrate the field curvature aberration in the sagittal direction and the field curvature aberration in the tangential direction on the image plane 99 of the first embodiment when the wavelength is 470 nm, 555 nm and 650 nm, and FIG. 7D illustrates the distortion aberration on the image plane 99 of the first embodiment when the wavelength is 470 nm, 555 nm, and 650 nm. In FIG. 7A illustrating the longitudinal spherical aberration of the first embodiment, the curves representing the respective wavelengths are close to each other and approach the center, indicating that off-axis rays in different heights at the respective wavelengths are focused in a vicinity of the imaging point. Based on extents of deviation of the curves for the respective wavelengths, imaging point deviations of the off-axis rays in different heights are controlled within a range of ±0.16 mm. Therefore, the spherical aberration of the same wavelength is reduced in the first embodiment, and the distances among the three representative wavelengths are also close, indicating that imaging positions of rays of different wavelengths are concentrated. Hence, chromatic aberration is also suppressed.

In FIG. 7B and FIG. 7C illustrating the field curvature aberration, the focal length variation of the three representative wavelengths in the whole field range fall within ±0.16 mm, indicating that the optical system provided in the first embodiment is able to effectively reduce aberration. In FIG. 7D illustrating the distortion aberration, the distortion aberration provided in the first embodiment is maintained within a range of ±25%, indicating that the distortion aberration provided in the first embodiment satisfies an imaging quality requirement of the optical system. Hence, compared with the conventional optical lens, the optical imaging lens provided in the first embodiment is able to render good imaging quality on a condition that the system length is reduced to 8.927 mm. Therefore, the optical imaging lens provided in the first embodiment may have a reduced Fno and an increased image height while maintaining the imaging quality under the condition of having good optical performance.

Figures 10, 11A, 11B, 11C, 11D:
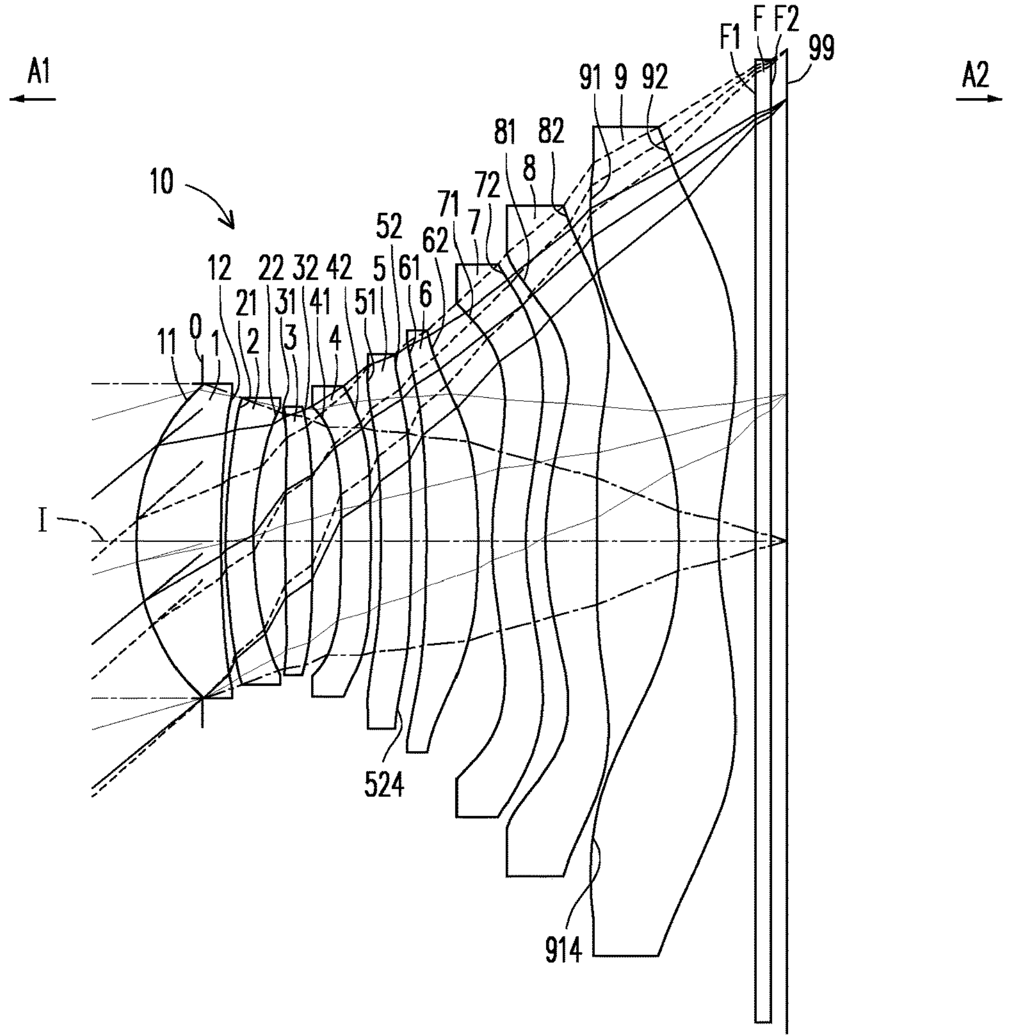
FIG. 10 is a schematic diagram illustrating an optical imaging lens according to a second embodiment of the disclosure.
FIG. 11A to FIG. 11D are diagrams illustrating a longitudinal spherical aberration and various aberrations of the optical imaging lens according to the second embodiment.

FIG. 10 is a schematic diagram illustrating an optical imaging lens according to a second embodiment of the disclosure, and FIG. 11A to FIG. 11D are diagrams illustrating a longitudinal spherical aberration and various aberrations of the optical imaging lens according to the second embodiment. With reference to FIG. 10, the second embodiment describing the optical imaging lens 10 is similar to the first embodiment, while the difference therebetween lies in the optical data, the aspheric coefficients, and the parameters of the lens elements 1, 2, 3, 4, 5, 6, 7, 8, and 9. In addition, in the present embodiment, the periphery region 524 of the image-side surface 52 of the fifth lens element 5 is convex, and the periphery region 914 of the object-side surface 91 of the ninth lens element 9 is convex. To clearly illustrate the drawing, some reference numerals indicating the optical axis regions and the periphery regions similar to those in the first embodiment are omitted in FIG. 10.

Detailed optical data of the optical imaging lens 10 provided in the second embodiment are as shown in FIG. 12. In addition, the EFL of the optical imaging lens 10 according to the second embodiment is 6.866 mm, and the HFOV thereof is 41.945°, the Fno thereof is 1.600, the system length thereof is 8.865 mm, and the image height thereof is 6.700 mm.

Respective aspheric coefficients in the formula (1) of the object-side surface 11 of the first lens element 1 to the image-side surface 92 of the ninth lens element 9 according to the second embodiment are as shown in FIG. 13.

In addition, relations of important parameters in the optical imaging lens 10 according to the second embodiment are as shown in FIG. 34.

The longitudinal spherical aberration provided in the second embodiment is as shown in FIG. 11A, and the imaging point deviations of the off-axis rays of different heights are controlled within a range of ±0.018 mm. In FIGS. 11B and 11C illustrating the field curvature aberrations, the focal length variation of the three representative wavelengths in the whole field of view falls within ±0.045 mm. The distortion aberration shown in FIG. 11D indicates that the distortion aberration provided in the second embodiment is maintained within a range of ±9%.

Compared to the first embodiment, the system length TTL provided in the second embodiment is shorter, and the field curvature, distortion, and longitudinal spherical aberration provided in the second embodiment are better than those provided in the first embodiment. Besides, the difference in the thickness of each lens element in the optical axis region and the periphery region in this embodiment is smaller than that provided in the first embodiment, and therefore the optical imaging lens provided in the second embodiment is, compared to that provided in the first embodiment, easier to be manufactured and has better yield.

Figure 14:
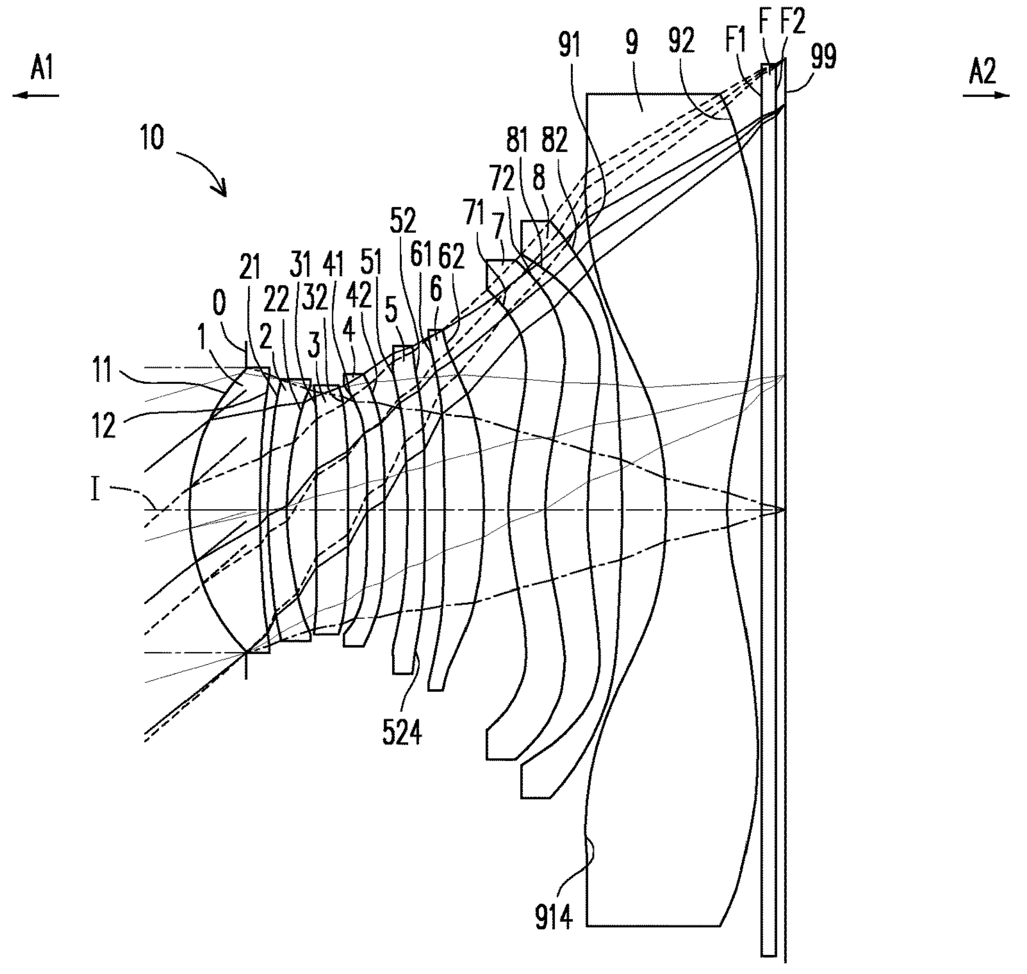
FIG. 14 is a schematic diagram illustrating an optical imaging lens according to a third embodiment of the disclosure.

FIG. 14 is a schematic diagram illustrating an optical imaging lens according to a third embodiment of the disclosure, and FIG. 15A to FIG. 15D are diagrams illustrating a longitudinal spherical aberration and various aberrations of the optical imaging lens according to the third embodiment. With reference to FIG. 14, the third embodiment describing the optical imaging lens 10 is similar to the first embodiment, while the difference therebetween lies in the optical data, the aspheric coefficients, and the parameters of the lens elements 1, 2, 3, 4, 5, 6, 7, 8, and 9. Furthermore, in the present embodiment, the fourth lens element 4 has positive refracting power, the periphery region 524 of the image-side surface 52 of the fifth lens element is convex, the seventh lens element 7 has positive refracting power, and the periphery region 914 of the object-side surface 91 of the ninth lens element 9 is convex. To clearly illustrate the drawing, some reference numerals indicating the optical axis regions and the periphery regions similar to those in the first embodiment are omitted in FIG. 14.

Detailed optical data of the optical imaging lens 10 provided in the third embodiment are as shown in FIG. 16, the EFL of the optical imaging lens 10 provided in the third embodiment is 6.768 mm, and the HFOV thereof is 41.410°, the Fno thereof is 1.600, the system length thereof is 8.837 mm, and the image height thereof is 6.700 mm.

Respective aspheric coefficients of the object-side surface 11 of the first lens element 1 to the image-side surface 92 of the ninth lens element 9 of the third embodiment in the formula (1) are as shown in FIG. 17.

In addition, relations of important parameters in the optical imaging lens 10 of the third embodiment are as shown in FIG. 34.

Figures 15A, 15B, 15C, 15D:
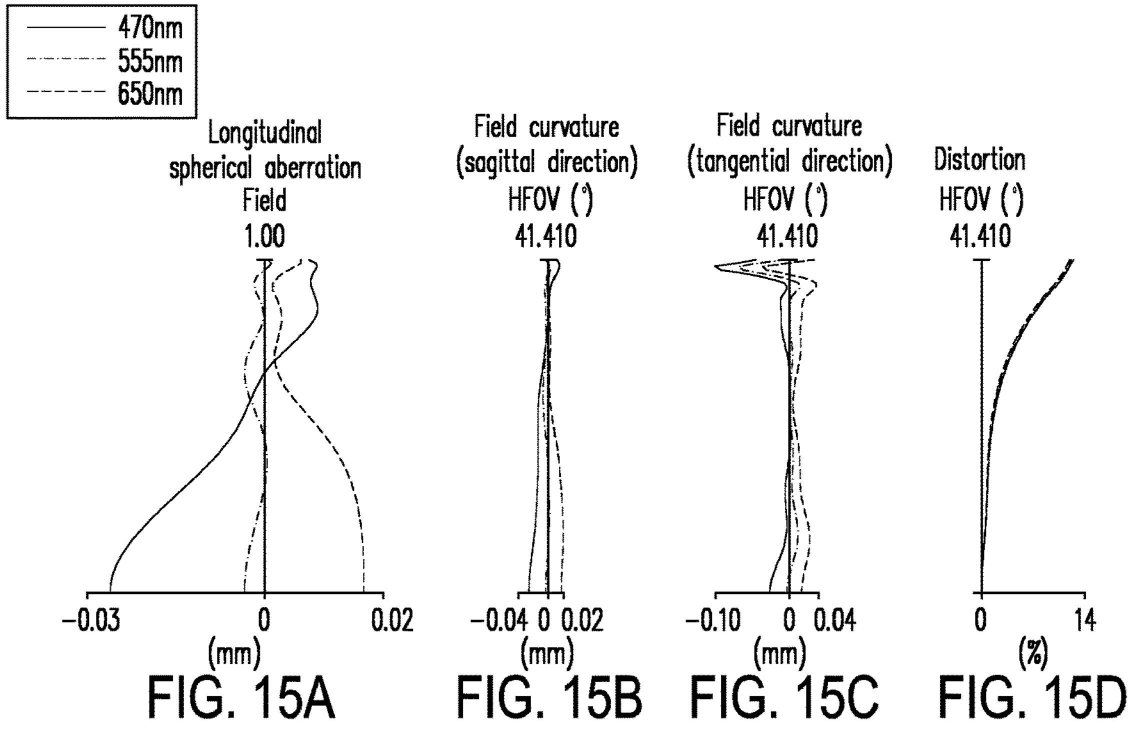
FIG. 15A to FIG. 15D are diagrams illustrating a longitudinal spherical aberration and various aberrations of the optical imaging lens according to the third embodiment.

The longitudinal spherical aberration provided in the third embodiment is as shown in FIG. 15A, and imaging point deviations of the off-axis rays in different heights are controlled within a range of ±0.03 mm. In FIGS. 15B and 15C illustrating the field curvature aberrations, the focal length variation of the three representative wavelengths in the whole field range is within ±0.10 mm. The distortion aberration shown in FIG. 15D indicates that the distortion aberration provided in the third embodiment is maintained within a range of ±14%.

Compared to the first embodiment, the system length TTL of the third embodiment is shorter. The field curvature, distortion, and longitudinal spherical aberration of the third embodiment are better than those provided in the first embodiment. Besides, the difference in the thickness of each lens element in the optical axis region and the periphery region in this embodiment is smaller than that provided in the first embodiment, and therefore the optical imaging lens provided in the third embodiment is, compared to that provided in the first embodiment, easier to be manufactured and has better yield.

Figure 18:
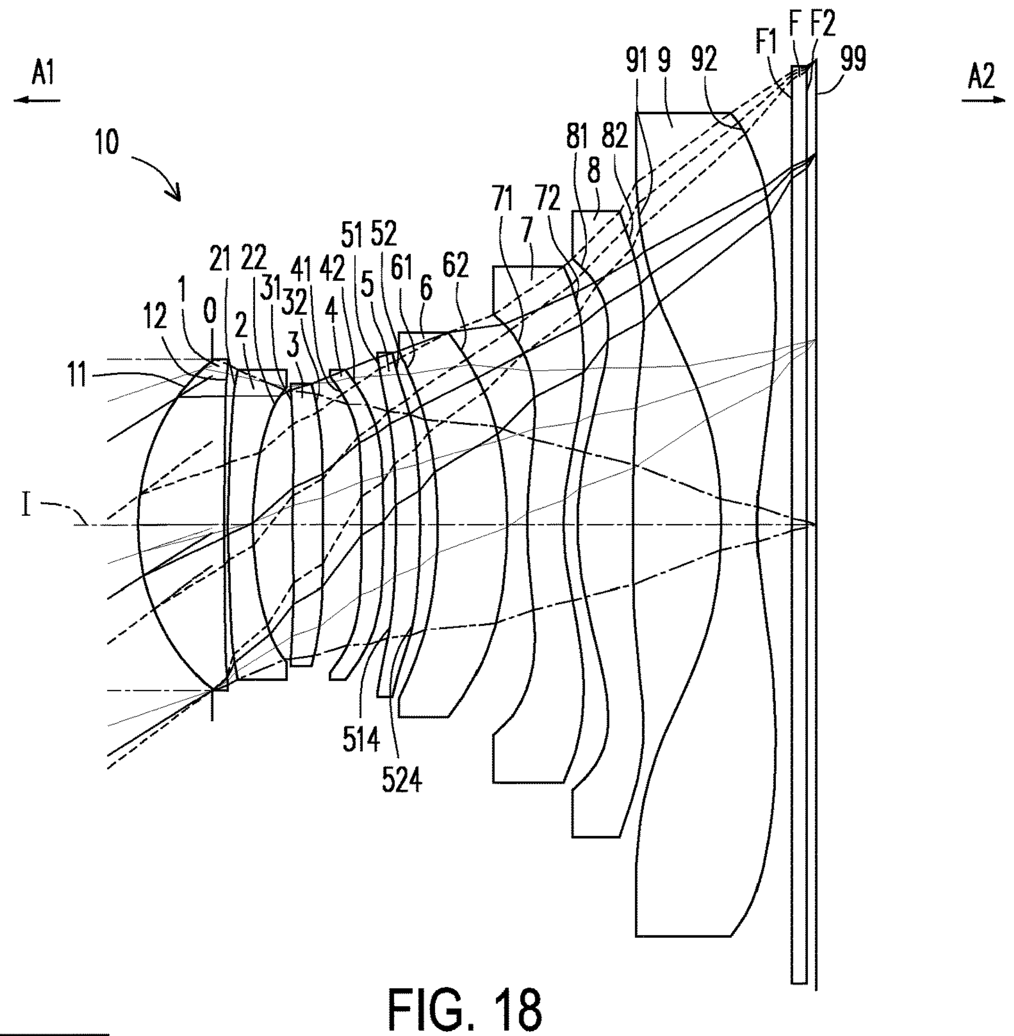
FIG. 18 is a schematic diagram illustrating an optical imaging lens according to a fourth embodiment of the disclosure.

FIG. 18 is a schematic diagram illustrating an optical imaging lens according to a fourth embodiment of the disclosure, and FIG. 19A to FIG. 19D are diagrams illustrating a longitudinal spherical aberration and various aberrations of the optical imaging lens according to the fourth embodiment. With reference to FIG. 18, the fourth embodiment describing the optical imaging lens 10 is similar to the first embodiment, while the difference therebetween lies in the optical data, the aspheric coefficients, and the parameters of the lens elements 1, 2, 3, 4, 5, 6, 7, 8, and 9. Furthermore, in the present embodiment, the fourth lens element 4 has positive refracting power, the fifth lens element 5 has positive refracting power, the periphery region 514 of the object-side surface 51 of the fifth lens element 5 is concave, the periphery region 524 of the image-side surface 52 is convex, and the sixth lens element 6 has negative refracting power. To clearly illustrate the drawing, some reference numerals indicating the optical axis regions and the periphery regions similar to those in the first embodiment are omitted in FIG. 18.

Detailed optical data of the optical imaging lens 10 provided in the fourth embodiment are as shown in FIG. 20, and the EFL of the optical imaging lens 10 provided in the fourth embodiment is 7.640 mm, and the HFOV thereof is 36.973°, the Fno thereof is 1.600, the system length thereof is 9.763 mm, and the image height thereof is 6.700 mm.

Respective aspheric coefficients of the object-side surface 11 of the first lens element 1 to the image-side surface 92 of the ninth lens element 9 of the fourth embodiment in the formula (1) are as shown in FIG. 21.

In addition, relations of important parameters in the optical imaging lens 10 according to the fourth embodiment are as shown in FIG. 34.

Figures 19A, 19B, 19C, 19D:
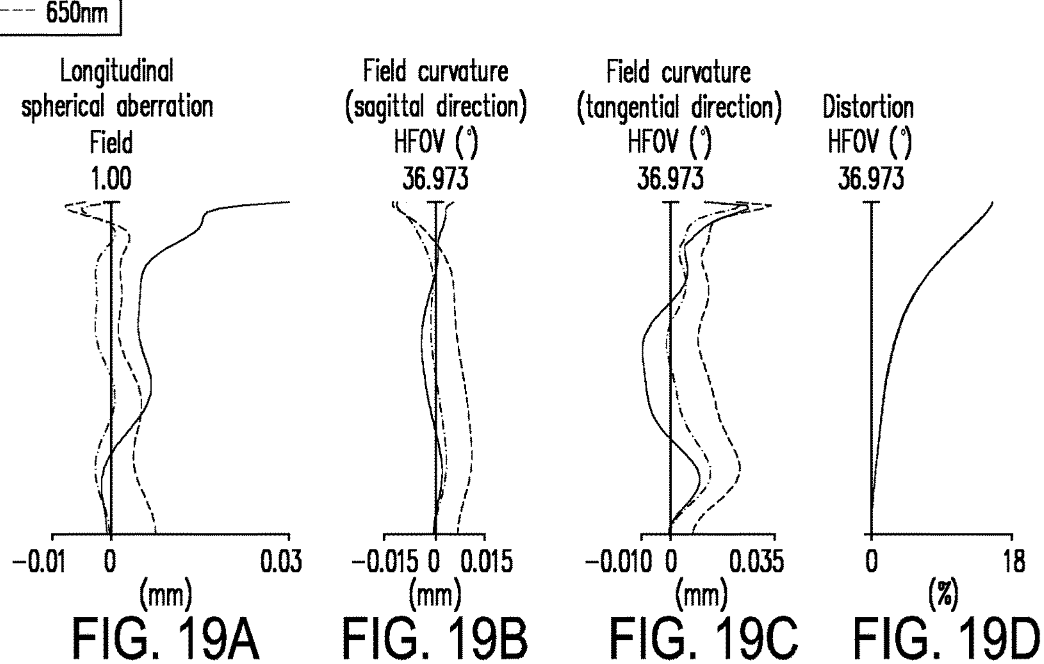
FIG. 19A to FIG. 19D are diagrams illustrating a longitudinal spherical aberration and various aberrations of the optical imaging lens according to the fourth embodiment.

The longitudinal spherical aberration provided in the fourth embodiment is as shown in FIG. 19A, and imaging point deviations of the off-axis rays in different heights are controlled within a range of ±0.03 mm. In FIGS. 19B and 19C illustrating the field curvature aberrations, the focal length variation of the three representative wavelengths in the whole field range falls within ±0.035 mm. The distortion aberration shown in FIG. 19D indicates that the distortion aberration provided in the fourth embodiment is maintained within a range of ±18%.

Compared to the first embodiment, the field curvature, distortion, and longitudinal spherical aberration of the fourth embodiment are better. Besides, the difference in the thickness of each lens element in the optical axis region and the periphery region is smaller than that provided in the first embodiment, and therefore the optical imaging lens provided in the fourth embodiment is, compared to that provided in the first embodiment, easier to be manufactured and has better yield.

Figure 22:
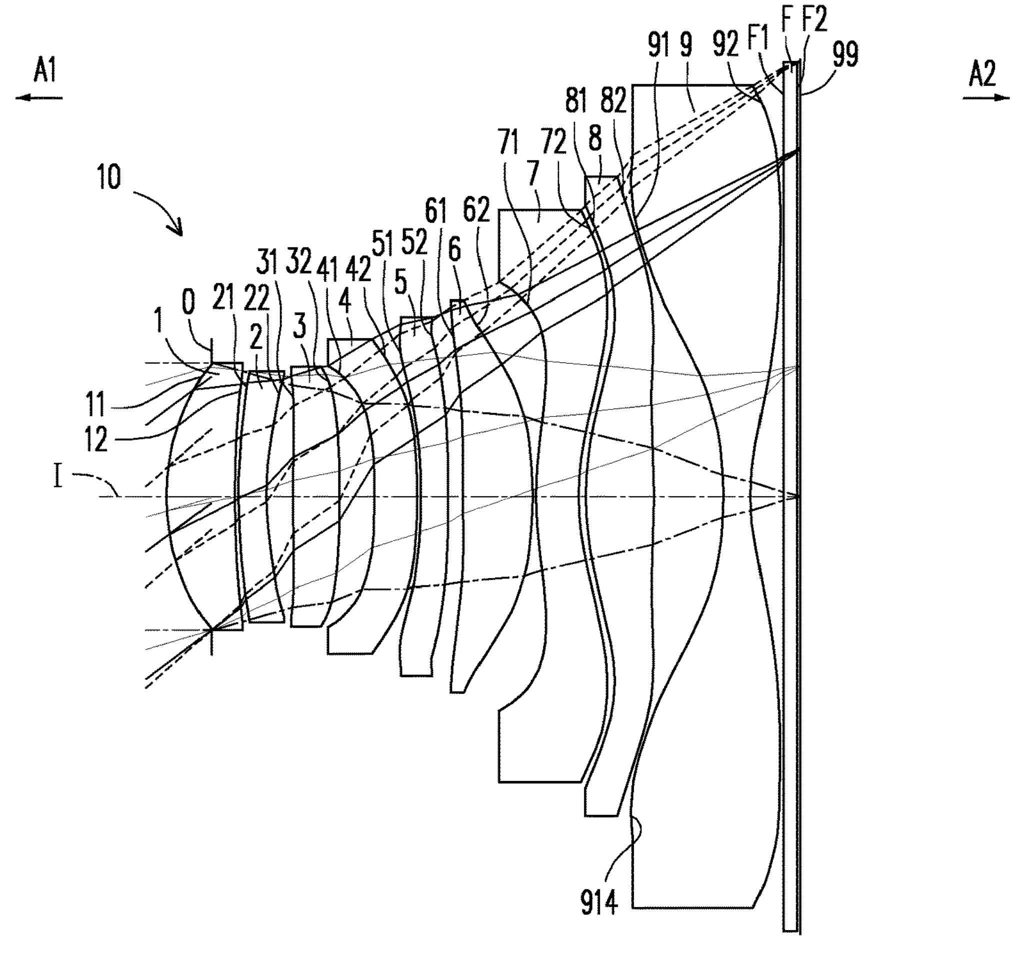
FIG. 22 is a schematic diagram illustrating an optical imaging lens according to a fifth embodiment of the disclosure.

FIG. 22 is a schematic diagram illustrating an optical imaging lens according to a fifth embodiment of the disclosure, and FIG. 23A to FIG. 23D are diagrams illustrating a longitudinal spherical aberration and various aberrations of the optical imaging lens according to the fifth embodiment. With reference to FIG. 22, the fifth embodiment describing the optical imaging lens 10 is similar to the first embodiment, while the difference therebetween lies in the optical data, the aspheric coefficients, and the parameters of the lens elements 1, 2, 3, 4, 5, 6, 7, 8, and 9. In addition, the periphery region 914 of the object-side surface 91 of the ninth lens element 9 is convex. To clearly illustrate the drawing, some reference numerals indicating the optical axis regions and the periphery regions similar to those in the first embodiment are omitted in FIG. 22.

Detailed optical data of the optical imaging lens 10 provided in the fifth embodiment is as shown in FIG. 24, and the EFL of the optical imaging lens 10 of the fifth embodiment is 6.560 mm, and the HFOV thereof is 41.750°, the Fno thereof is 1.600, the system length thereof is 9.719 mm, and the image height thereof is 6.700 mm.

Respective aspheric coefficients of the object-side surface 11 of the first lens element 1 to the image-side surface 92 of the ninth lens element 9 of the fifth embodiment in the formula (1) are as shown in FIG. 25.

In addition, relations of important parameters in the optical imaging lens 10 according to the fifth embodiment are as shown in FIG. 34.

Figures 23A, 23B, 23C, 23D:
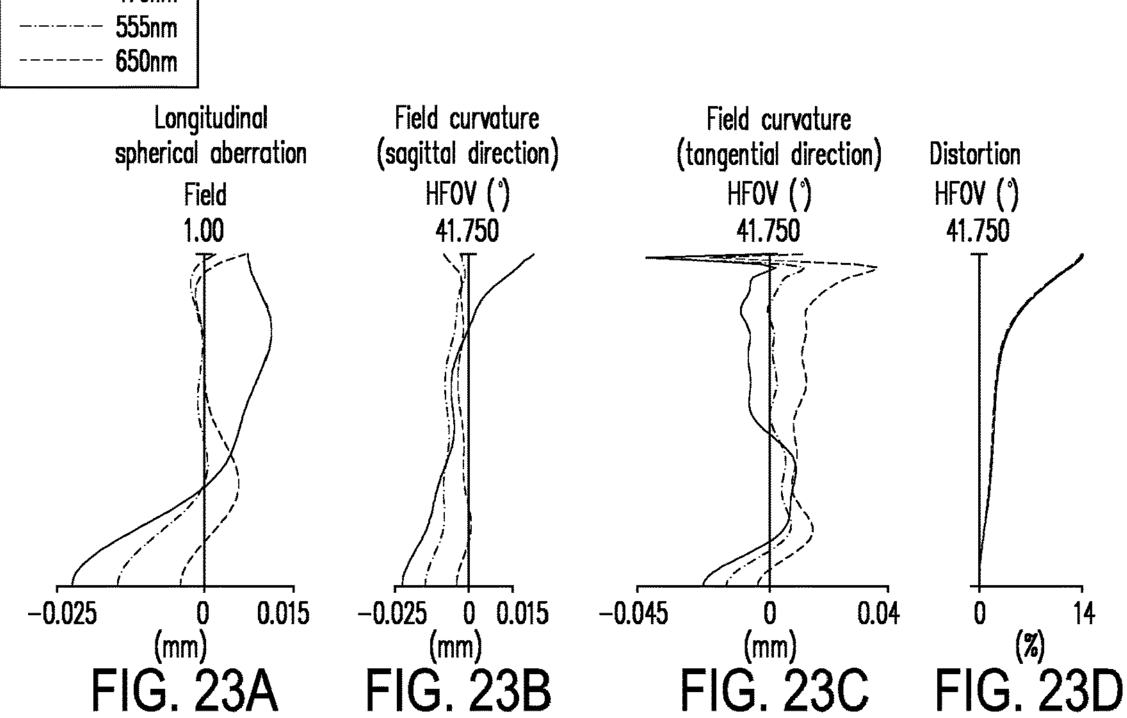
FIG. 23A to FIG. 23D are diagrams illustrating a longitudinal spherical aberration and various aberrations of the optical imaging lens according to the fifth embodiment.

The longitudinal spherical aberration provided in the fifth embodiment is shown in FIG. 23A, and imaging point deviations of the off-axis rays in different heights are controlled within a range of ±0.025 mm. In FIGS. 23B and 23C illustrating the field curvature aberrations, the focal length variation of the three representative wavelengths in the whole field range falls within ±0.045 mm. The distortion aberration shown in FIG. 23D indicates that the distortion aberration provided in the fifth embodiment is maintained within a range of ±14%.

Compared to the first embodiment, the field curvature, distortion, and longitudinal spherical aberration of the fifth embodiment are better than those provided in the first embodiment. Besides, the difference in the thickness of each lens element in the optical axis region and the periphery region in this embodiment is smaller than that provided in the first embodiment, and therefore the optical imaging lens provided in the fifth embodiment is, compared to that provided in the first embodiment, easier to be manufactured and has better yield.

Figure 26:
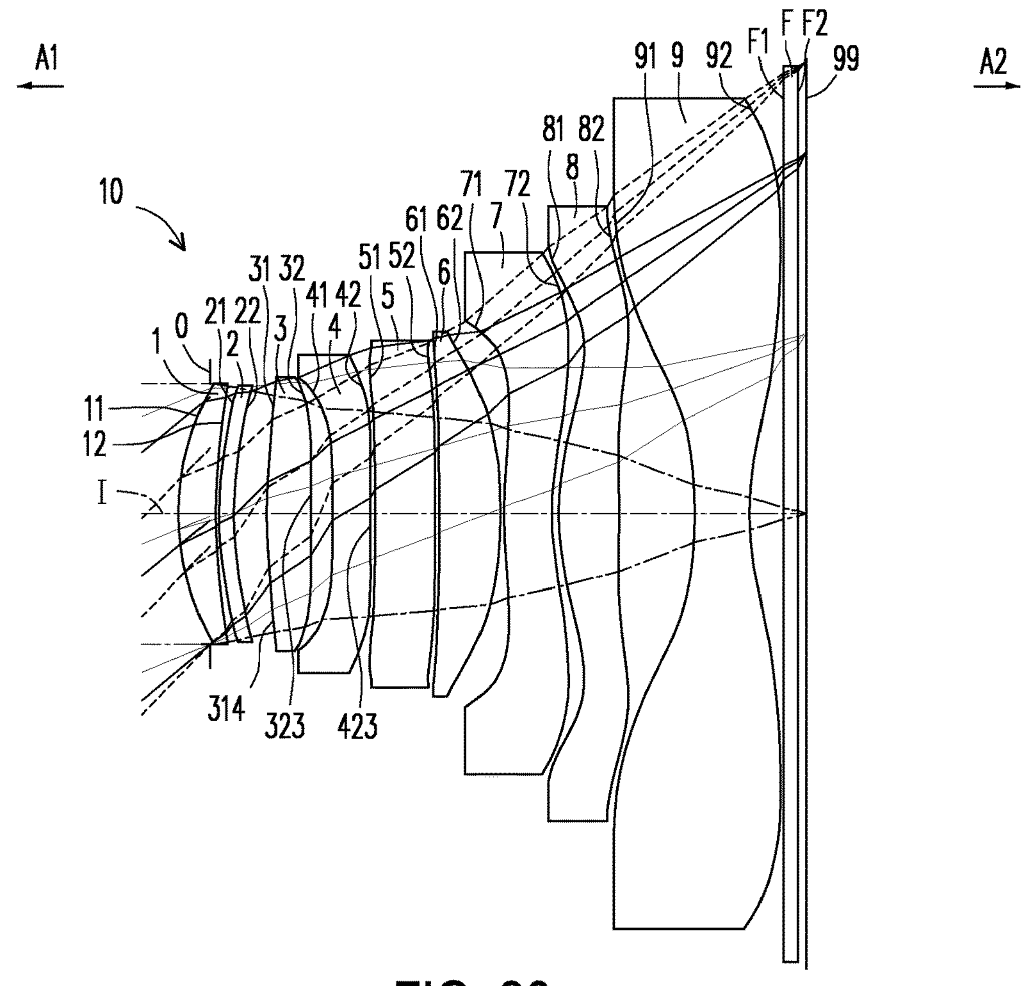
FIG. 26 is a schematic diagram illustrating an optical imaging lens according to a sixth embodiment of the disclosure.

FIG. 26 is a schematic diagram illustrating an optical imaging lens according to a sixth embodiment of the disclosure, and FIG. 27A to FIG. 27D are diagrams illustrating a longitudinal spherical aberration and various aberrations of the optical imaging lens according to the sixth embodiment. With reference to FIG. 26, the sixth embodiment describing the optical imaging lens 10 is similar to the first embodiment, while the difference therebetween lies in the optical data, the aspheric coefficients, and the parameters of the lens elements 1, 2, 3, 4, 5, 6, 7, 8, and 9. In addition, in the present embodiment, the periphery region 314 of the object-side surface 31 of the third lens element 3 is convex, the optical axis region 323 of the image-side surface 32 is concave, and the optical axis region 423 of the image-side surface 42 of the fourth lens element 4 is concave. To clearly illustrate the drawing, some reference numerals indicating the optical axis regions and the periphery regions similar to those in the first embodiment are omitted in FIG. 26.

Detailed optical data of the optical imaging lens 10 provided in the sixth embodiment is as shown in FIG. 28, and the EFL of the optical imaging lens 10 of the sixth embodiment is 6.174 mm, the HFOV thereof is 46.261°, the Fno thereof is 1.600, the system length thereof is 9.278 mm, and the image height thereof is 6.700 mm.

Respective aspheric coefficients of the object-side surface 11 of the first lens element 1 to the image-side surface 92 of the ninth lens element 9 of the sixth embodiment in the formula (1) are as shown in FIG. 29.

In addition, relations of important parameters in the optical imaging lens 10 according to the sixth embodiment are as shown in FIG. 35.

Figures 27A, 27B, 27C, 27D:
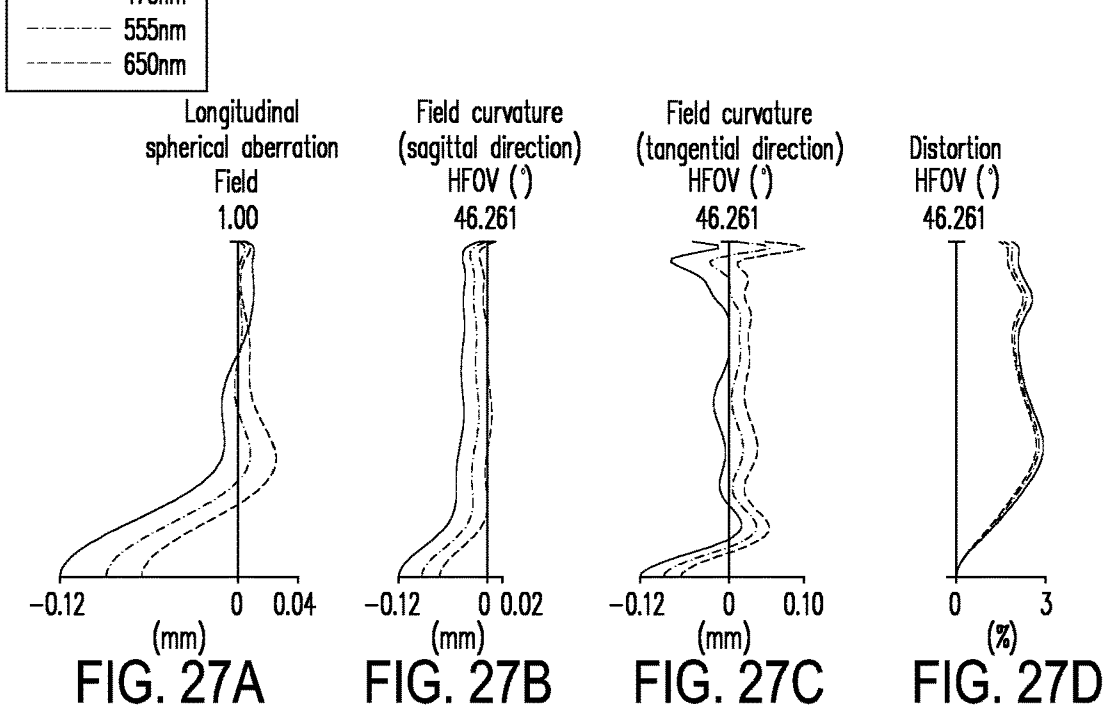
FIG. 27A to FIG. 27D are diagrams illustrating a longitudinal spherical aberration and various aberrations of the optical imaging lens according to the sixth embodiment.

The longitudinal spherical aberration provided in the sixth embodiment is shown in FIG. 27A, and imaging point deviations of the off-axis rays in different heights are controlled within a range of ±0.12 mm. In FIGS. 27B and 27C illustrating the field curvature aberrations, the focal length variation of the three representative wavelengths in the whole field range falls within ±0.12 mm. The distortion aberration shown in FIG. 27D indicates that the distortion aberration provided in the sixth embodiment is maintained within a range of ±3%.

Compared to the first embodiment, the HFOV of the sixth embodiment is larger than that provided in the first embodiment, and the field curvature, distortion, and longitudinal spherical aberration of the sixth embodiment are better than those provided in the first embodiment. Besides, the difference in the thickness of each lens element in the optical axis region and the periphery region in this embodiment is smaller than that provided in the first embodiment, and therefore the optical imaging lens provided in the sixth embodiment is, compared to that provided in the first embodiment, easier to be manufactured and has better yield.

Figure 30:
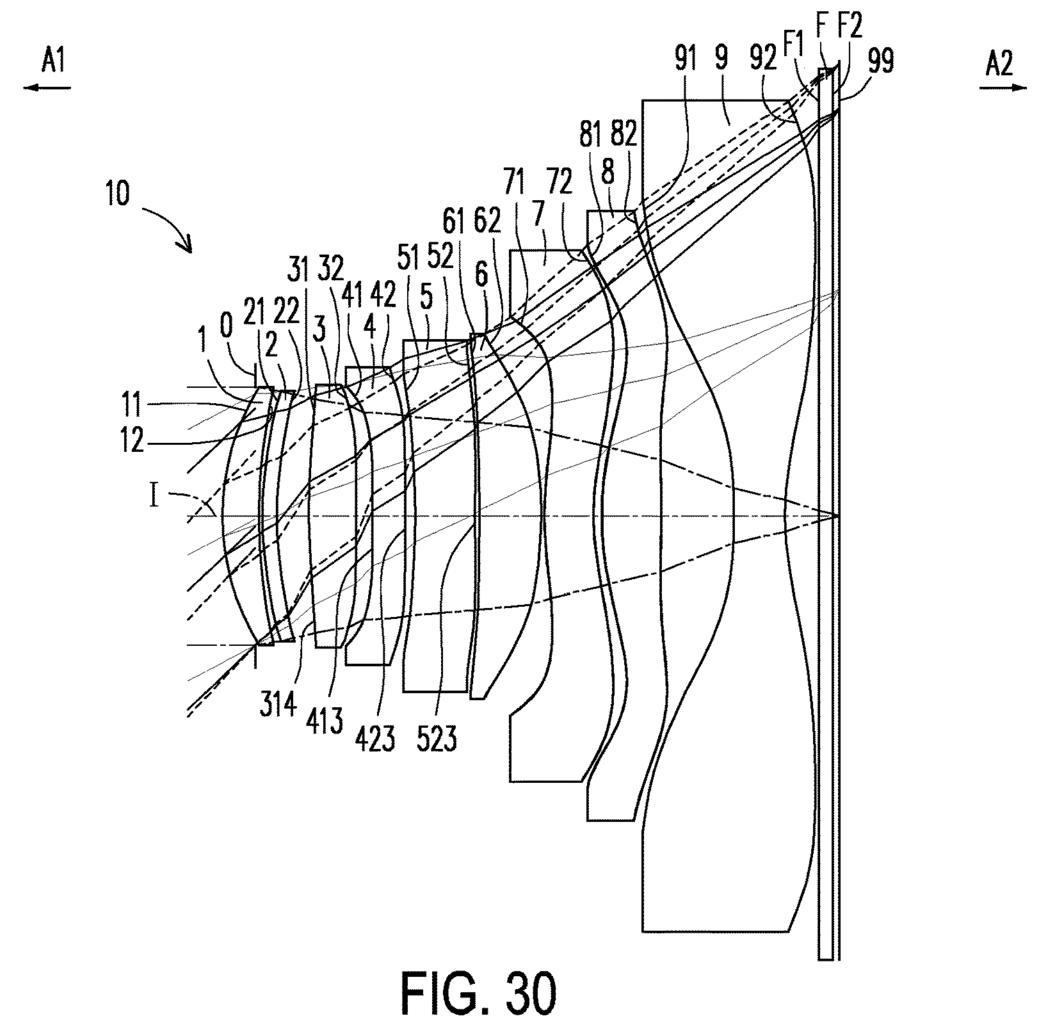
FIG. 30 is a schematic diagram illustrating an optical imaging lens according to a seventh embodiment of the present disclosure.

FIG. 30 is a schematic diagram illustrating an optical imaging lens according to a seventh embodiment of the disclosure, and FIG. 31A to FIG. 31D are diagrams illustrating a longitudinal spherical aberration and various aberrations of the optical imaging lens according to the seventh embodiment. With reference to FIG. 30, the seventh embodiment describing the optical imaging lens 10 is similar to the first embodiment, while the difference therebetween lies in the optical data, the aspheric coefficients, and the parameters of the lens elements 1, 2, 3, 4, 5, 6, 7, 8, and 9. Furthermore, in the present embodiment, the second lens element 2 has positive refracting power, the periphery region 314 of the object-side surface 31 of the third lens element 3 is convex, the optical axis region 413 of the object-side surface 41 of the fourth lens element 4 is convex, the optical axis region 423 of the image-side surface 42 is concave, and the optical axis region 523 of the image-side surface 52 of the fifth lens element 5 is concave. To clearly illustrate the drawing, some reference numerals indicating the optical axis regions and the periphery regions similar to those in the first embodiment are omitted in FIG. 30.

Detailed optical data of the optical imaging lens 10 provided in the seventh embodiment is as shown in FIG. 32, and the EFL of the optical imaging lens 10 of the seventh embodiment is 6.099 mm, the HFOV thereof is 46.817°, the Fno thereof is 1.600, the system length thereof is 9.137 mm, and the image height thereof is 6.700 mm.

Respective aspheric coefficients of the object-side surface 11 of the first lens element 1 to the image-side surface 92 of the ninth lens element 9 of the seventh embodiment in the formula (1) are as shown in FIG. 33.

In addition, relations of important parameters in the optical imaging lens 10 of the seventh embodiment are as shown in FIG. 35.

Figures 31A, 31B, 31C, 31D:
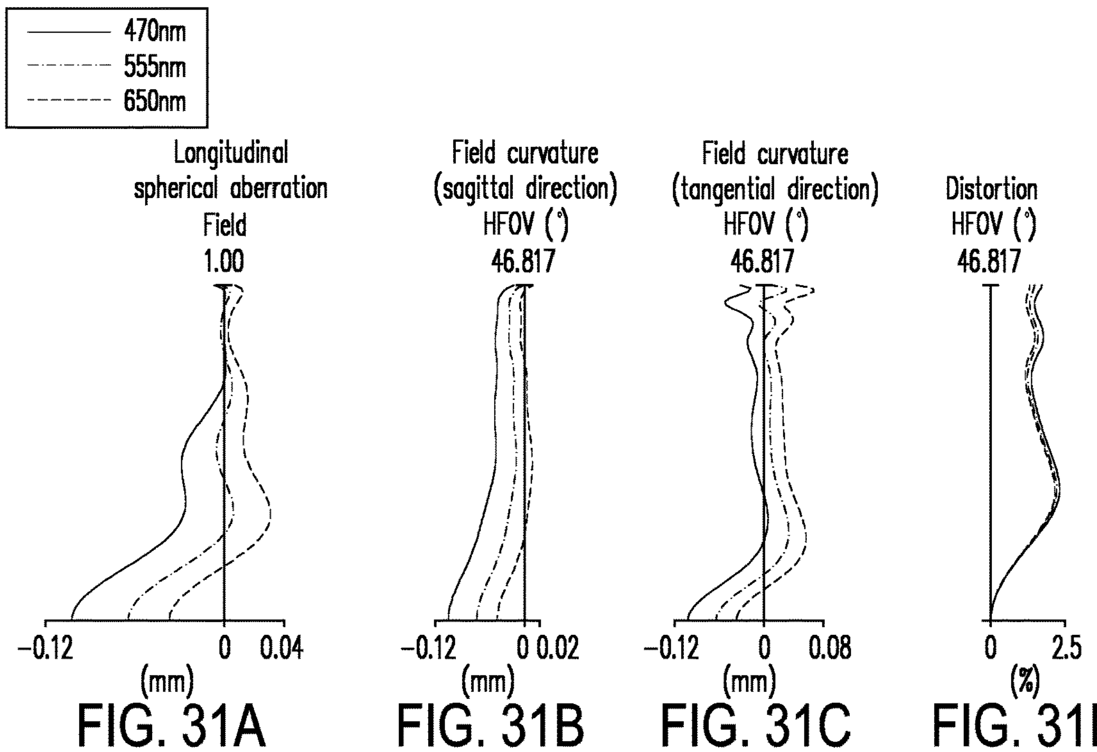
FIG. 31A to FIG. 31D are diagrams illustrating a longitudinal spherical aberration and various aberrations of the optical imaging lens according to the seventh embodiment.

The longitudinal spherical aberration provided in the seventh embodiment is as shown in FIG. 31A, and imaging point deviations of the off-axis rays in different heights are controlled within a range of ±0.12 mm. In FIGS. 31B and 31C illustrating the field curvature aberrations, the focal length variation of the three representative wavelengths in the whole field range falls within ±0.12 mm. The distortion aberration shown in FIG. 31D indicates that the distortion aberration provided in the seventh embodiment is maintained within a range of ±2.5%.

Compared to the first embodiment, the HFOV of the seventh embodiment is larger than that provided in the first embodiment, and the field curvature, distortion, and longitudinal spherical aberration of the seventh embodiment are better than those provided in the first embodiment. Besides, the difference in the thickness of each lens element in the optical axis region and the periphery region in this embodiment is smaller than that provided in the first embodiment, and therefore the optical imaging lens provided in the seventh embodiment is, compared to that provided in the first embodiment, easier to be manufactured and has better yield.

FIG. 34 and FIG. 35 are tables showing respective optical parameters according to the first embodiment to the seventh embodiment.

In addition, the lens material of the optical imaging lens 10 according to the embodiment of the present disclosure conforming to the following configuration relationship is beneficial to the transmission and deflection of imaging rays, and it also improves the chromatic aberration effectively at the same time, such that the optical imaging lens 10 can demonstrate excellent optical quality.

The optical imaging lens 10 of the embodiment of the present disclosure satisfies: V2+V3+V4≤120.000, preferably 85.000≤V2+V3+V4≤120.000.

The optical imaging lens 10 of the embodiment of the present disclosure further satisfies: V4+V5+V6≤120.000, preferably 85.000≤V4+V5+V6≤120.000.

The optical imaging lens 10 of the embodiment of the present disclosure further satisfies: (V3+V4+V5)/V9≤2.500, preferably 1.600≤(V3+V4+V5)/V9≤2.500.

To shorten the system length of the lens elements and to ensure the image quality considering the complexity of production, the air gap between the lens elements or the thickness of the lens elements are properly reduced. The configuration of the embodiments of the present disclosure may be optimized when at least one of the following conditions is satisfied.

The optical imaging lens 10 of the embodiment of the present disclosure further satisfies: TTL/EFL≤2.600, preferably 1.150≤TTL/EFL≤2.600.

The optical imaging lens 10 of the embodiment of the present disclosure further satisfies: TL/(EFL+BFL)≤1.300, preferably 0.950≤TL/(EFL+BFL)≤1.300.

The optical imaging lens 10 of the embodiment of the present disclosure further satisfies: Tmax/Tmin≤4.200, preferably 2.250≤Tmax/Tmin≤4.200.

The optical imaging lens 10 of the embodiment of the present disclosure further satisfies: (T4+G45+T5+G56)/T6≤2.000, preferably 0.800≤(T4+G45+T5+G56)/T6≤2.000.

The optical imaging lens 10 of the embodiment of the present disclosure further satisfies: AAG/(G23+G34+G89)≤2.300, preferably 1.000≤AAG/(G23+G34+G89)≤2.300.

The optical imaging lens 10 of the embodiment of the present disclosure further satisfies: TTL/(G23+Tmax)≤6.700, preferably 4.700≤TTL/(G23+Tmax)≤6.700.

The optical imaging lens 10 of the embodiment of the present disclosure further satisfies: ALT/EFL≤1.000, preferably 0.650≤ALT/EFL≤1.000.

The optical imaging lens 10 of the embodiment of the present disclosure further satisfies: T1/Tmin≥2.500, preferably 2.500≤T1/Tmin≤4.500.

The optical imaging lens 10 of the embodiment of the present disclosure further satisfies: (T6+T7+T8+T9)/Tavg2345≥5.700, preferably 5.700≤(T6+T7+T8+T9)/Tavg2345≤8.700.

The optical imaging lens 10 of the embodiment of the present disclosure further satisfies: (G45+G56+G67+G78)/T9≤1.800, preferably 0.300≤(G45+G56+G67+G78)/T9≤1.800.

The optical imaging lens 10 of the embodiment of the present disclosure further satisfies: TL/(G89+Tmax)≤4.700, preferably 2.900≤TL/(G89+Tmax)≤4.700.

The optical imaging lens 10 of the embodiment of the present disclosure further satisfies: AAG/(T1+BFL)≤1.650, preferably 1.100≤AAG/(T1+BFL)≤1.650.

The optical imaging lens 10 of the embodiment of the present disclosure further satisfies: T6/T4≥1.600, preferably 1.600≤T6/T4≤3.500.

The optical imaging lens 10 of the embodiment of the present disclosure further satisfies: (T6+T8)/T7≥2.000, preferably 2.000≤(T6+T8)/T7≤7.700.

The optical imaging lens 10 of the embodiment of the present disclosure further satisfies: (G23+T3+G34)/(G12+T2)≥2.700, preferably 2.700≤(G23+T3+G34)/(G12+T2)≤6.000.

The optical imaging lens 10 of the embodiment of the present disclosure further satisfies: (G23+T3+G34+G78+T8+G89)/(G12+T2)≥7.400, preferably 7.400≤(G23+T3+G34+G78+T8+G89)/(G12+T2)≤14.500.

The optical imaging lens 10 of the embodiment of the present disclosure further satisfies: (G23+T3+G34 G78)/(G12+T2)≥3.300, preferably 3.300≤(G23+T3+G34 G78)/(G12+T2)≤6.500.

Besides, for lens designs having frameworks similar to that of the embodiments of the invention, limitations on the lens may be added by choosing an arbitrary combination/relation of the parameters of the embodiments.

Considering the unpredictability in the design of optical system, the structure of the present disclosure enables the system of the present disclosure may have a shorter system length, a smaller f-number, a larger image height, an improved imaging quality, or a facilitated assembling yield rate and overcome drawbacks of the conventional optical imaging lenses if the above conditions are satisfied. Additionally, the lens elements provided herein are made of plastic, which ensures that the weight of the lens elements can be further reduced, and that the relevant costs can be saved.

The range including maximum and minimum numeral values derived from the combinations of the optical parameters disclosed in the embodiments herein and the values between the maximum and minimum numeral values may all be applicable and enable people skilled in the pertinent art to carry out the embodiments of the disclosure.

To sum up, the optical imaging lens provided in one or more embodiments of the disclosure can achieve the following effects and have advantages below:

1. The longitudinal spherical aberration, field curvature aberration, and distortion provided in one or more embodiments of the disclosure all comply with the standard. Besides, the off-axis rays with three representative wavelengths of red, green, and blue are all focused in a vicinity of the imaging point; based on extents of deviation of the curves for the respective wavelengths, the imaging point deviations of the off-axis rays in different heights are well controlled; therefore, the ability of suppressing the spherical aberration, the aberration, and the distortion can be guaranteed. With further reference to the imaging quality data, the distance among the three representative wavelengths of red, green and blue is close, which indicates that the concentration of rays at different wavelengths on various conditions is favorable, and the chromatic aberration can be well suppressed according to one or more embodiments provided herein. It can thus be learned that the optical imaging lens provided herein is characterized by good imaging quality with the design and configuration of the lens elements.
2. As the first lens element is designed to have positive refracting power, and the periphery region of the image-side surface of the third lens element is convex, the optical imaging lens can converge rays of different angles. When further combined with the configuration that the periphery region of the object side of the fifth lens element is convex, the sixth lens element is designed to have positive refracting power, and the periphery region of the image-side surface of the seventh lens element is convex, the optical imaging lens can correct the spherical aberration and the edge aberration of the image plane caused by the first lens element to the third lens element. In addition, the manufacturing yield of the lens elements can be increased, and the volume of the optical imaging lens can be well controlled by the configuration of ALT/Tavg2345≥10.000 that controls the thickness ratio between each lens element, wherein the range of ALT/Tavg2345 is preferably 10.000≤ALT/Tavg2345≤16.500.
3. As the first lens element is designed to have positive refracting power, the periphery region of the object side of the first lens element is convex, and the optical axis region of the image-side surface of the third lens element is convex, the optical imaging lens can converge rays of different angles. When further combined with the configuration that the periphery region of the image-side surface of the fourth lens element is convex, the optical axis region of the image-side surface of the sixth lens element is convex, and the optical axis region of the image-side surface of the seventh lens element is concave, the optical imaging lens can correct the spherical aberration and the image aberration of the image plane caused by the first lens element to the third lens element. In addition, the manufacturing yield of the lens elements can be increased, and the volume of the optical imaging lens can be well controlled by the configuration of ALT/Tavg2345≥10.000 that controls the thickness ratio between each lens element, wherein the range of ALT/Tavg2345 is preferably 10.000≤ALT/Tavg2345≤16.500.
4. As the first lens element is designed to have positive refracting power, the periphery region of the image-side surface of the second lens element is concave, and the optical axis region of the image-side surface of the third lens element is convex, the optical imaging lens can converge rays of different angles. When further combined with the configuration that the periphery region of the image-side surface of the fourth lens element is convex, the optical axis region of the image-side surface of the seventh lens element is concave, and that the optical axis region of the image-side surface of the ninth lens element is concave, the optical imaging lens can correct the spherical aberration and the image aberration of the image plane caused by the first lens element to the third lens element. In addition, the manufacturing yield of the lens elements can be increased, and the volume of the optical imaging lens can be well controlled by the configuration of ALT/Tavg2345≥10.000 that controls the thickness ratio between each lens element, wherein the range of ALT/Tavg2345 is preferably 10.000≤ALT/Tavg2345≤16.500.
5. As mentioned above in the second to fourth points, the distortion of the optical imaging lens can be well reduced if the third lens element is further designed to have positive refracting power, or the eighth lens element is designed to have positive refracting power, or the ninth lens element is designed to have negative refracting power, which can also improve the assembly yield of the lens elements.
6. The lens elements provided in each embodiment of the disclosure are aspherical to optimize the imaging quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \le A \le \alpha_1$ or $\beta_2 \le B \le \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \le \gamma_1$ or $E \ge \gamma_2$ or $\gamma_2 \le E \le \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Although the present disclosure has been disclosed as above with examples, they are not intended to limit the present disclosure. Anyone with ordinary knowledge in the technical field can make some changes and modifications without departing from the spirit and scope of the present disclosure. The protection scope of the present disclosure shall be determined by the scope of the following claims and their equivalents.

What is claimed is:

1. An optical imaging lens, comprising a first lens element, a second lens element, a third lens element, a fourth lens element, a fifth lens element, a sixth lens element, a seventh lens element, an eighth lens element, and a ninth lens element arranged in sequence from an object side to an image side along an optical axis, each of the first lens element to the ninth lens element comprising an object-side surface facing the object side and allowing imaging rays to pass through and an image-side surface facing the image side and allowing the imaging rays to pass through, wherein:

the first lens element has positive refracting power;

a periphery region of the image-side surface of the third lens element is convex;

a periphery region of the object-side surface of the fifth lens element is convex;

the sixth lens element has positive refracting power;

a periphery region of the image-side surface of the seventh lens element is convex;

lens elements of the optical imaging lens are only the nine lens elements described above, and the optical imaging lens satisfies: ALT/Tavg2345≥10.000, wherein ALT is a sum of thicknesses of nine lens elements from the first lens element to the ninth lens element on the optical axis, and Tavg2345 is an average of thicknesses of four lens elements from the second lens element to the fifth lens element on the optical axis.

2. The optical imaging lens according to claim 1, further satisfying: V2+V3+V4≤120.000, wherein V2 is an Abbe number of the second lens element, V3 is an Abbe number of the third lens element, and V4 is an Abbe number of the fourth lens element.

3. The optical imaging lens according to claim 1, further satisfying: TTL/EFL≤2.600, wherein TTL is a distance from the object-side surface of the first lens element to an image plane on the optical axis, and EFL is an effective focal length of the optical imaging lens.

4. The optical imaging lens according to claim 1, further satisfying: TL/(EFL+BFL)≤1.300, wherein TL is a distance from the object-side surface of the first lens element to the image-side surface of the ninth lens element on the optical axis, EFL is an effective focal length of the optical imaging lens, and BFL is a distance from the image-side surface of the ninth lens element to an image plane on the optical axis.

5. The optical imaging lens according to claim 1, further satisfying: Tmax/Tmin≤4.200, wherein Tmax is a maximum thickness of nine lens elements from the first lens element to the ninth lens element on the optical axis, and Tmin is a minimum thickness of nine lens elements from the first lens element to the ninth lens element on the optical axis.

6. The optical imaging lens according to claim 1, further satisfying: (T4+G45+T5+G56)/T6≤2.000, wherein T4 is a thickness of the fourth lens element on the optical axis, T5 is a thickness of the fifth lens element on the optical axis, T6 is a thickness of the sixth lens element on the optical axis, G45 is an air gap between the fourth lens element and the fifth lens element on the optical axis, and G56 is an air gap between the fifth lens element and the sixth lens element on the optical axis.

7. The optical imaging lens according to claim 1, further satisfying: AAG/(G23+G34+G89)≤2.300, wherein AAG is a sum of eight air gaps from the first lens element to the ninth lens element on the optical axis, G23 is an air gap between the second lens element and the third lens element on the optical axis, G34 is an air gap between the third lens element and the fourth lens element on the optical axis, and G89 is an air gap between the eighth lens element and the ninth lens element on the optical axis.

8. An optical imaging lens, comprising a first lens element, a second lens element, a third lens element, a fourth lens element, a fifth lens element, a sixth lens element, a seventh lens element, an eighth lens element, and a ninth lens element arranged in sequence from an object side to an image side along an optical axis, each of the first lens element to the ninth lens element comprising an object-side surface facing the object side and allowing imaging rays to pass through and an image-side surface facing the image side and allowing the imaging rays to pass through, wherein:

the first lens element has positive refracting power, and a periphery region of the object-side surface of the first lens element is convex;

an optical axis region of the image-side surface of the third lens element is convex;

a periphery region of the image-side surface of the fourth lens element is convex;

an optical axis region of the image-side surface of the sixth lens element is convex;

an optical axis region of the image-side surface of the seventh lens element is concave, wherein lens elements of the optical imaging lens are only the nine lens elements described above, and the optical imaging lens satisfies: ALT/Tavg2345≥10.000, wherein ALT is a sum of thicknesses of nine lens elements from the first lens element to the ninth lens element on the optical axis, and Tavg2345 is an average of thicknesses of four lens elements from the second lens element to the fifth lens element on the optical axis.

9. The optical imaging lens according to claim 8, further satisfying: $V4+V5+V6 \leq 120.000$, wherein V4 is an Abbe number of the fourth lens element, V5 is an Abbe number of the fifth lens element, and V6 is an Abbe number of the sixth lens element.

10. The optical imaging lens according to claim 8, further satisfying: $TTL/(G23+Tmax) \leq 6.700$, wherein TTL is a distance from the object-side surface of the first lens element to an image plane on the optical axis, G23 is an air gap between the second lens element and the third lens element on the optical axis, and Tmax is a maximum thickness of nine lens elements from the first lens element to the ninth lens element on the optical axis.

11. The optical imaging lens according to claim 8, further satisfying: $ALT/EFL \leq 1.000$, wherein EFL is an effective focal length of the optical imaging lens.

12. The optical imaging lens according to claim 8, further satisfying: $T1/Tmin \geq 2.500$, wherein T1 is a thickness of the first lens element on the optical axis, and Tmin is a minimum thickness of nine lens elements from the first lens element to the ninth lens element on the optical axis.

13. The optical imaging lens according to claim 8, further satisfying: $(T6+T7+T8+T9)/Tavg2345 \geq 5.700$, wherein T6 is a thickness of the sixth lens element on the optical axis, T7 is a thickness of the seventh lens element on the optical axis, T8 is a thickness of the eighth lens element on the optical axis, and T9 is a thickness of the ninth lens element on the optical axis.

14. The optical imaging lens according to claim 8, further satisfying: $(G45+G56+G67+G78)/T9 \leq 1.800$, wherein G45 is an air gap between the fourth lens element and the fifth lens element on the optical axis, G56 is an air gap between the fifth lens element and the sixth lens element on the optical axis, G67 is an air gap between the sixth lens element and the seventh lens element on the optical axis, G78 is an air gap between the seventh lens element and the eighth lens element on the optical axis, and T9 is a thickness of the ninth lens element on the optical axis.

15. An optical imaging lens, comprising a first lens element, a second lens element, a third lens element, a fourth lens element, a fifth lens element, a sixth lens element, a seventh lens element, an eighth lens element, and a ninth lens element arranged in sequence from an object side to an image side along an optical axis, each of the first lens element to the ninth lens element comprising an object-side surface facing the object side and allowing imaging rays to pass through and an image-side surface facing the image side and allowing the imaging rays to pass through, wherein:

the first lens element has positive refracting power;

a periphery region of the image-side surface of the second lens element is concave;

an optical axis region of the image-side surface of the third lens element is convex;

a periphery region of the image-side surface of the fourth lens element is convex;

an optical axis region of the image-side surface of the sixth lens element is convex;

an optical axis region of the image-side surface of the seventh lens element is concave;

an optical axis region of the image-side surface of the ninth lens element is concave;

lens elements of the optical imaging lens are only the nine lens elements described above, and the optical imaging lens satisfies: $ALT/Tavg2345 \geq 10.000$, wherein ALT is a sum of thicknesses of nine lens elements from the first lens element to the ninth lens element on the optical axis, and Tavg2345 is an average of thicknesses of four lens elements from the second lens element to the fifth lens element on the optical axis.

16. The optical imaging lens according to claim 15, further satisfying: $(V3+V4+V5)/V9 \leq 2.500$, wherein V3 is an Abbe number of the third lens element, V4 is an Abbe number of the fourth lens element, V5 is an Abbe number of the fifth lens element, and V9 is an Abbe number of the ninth lens element.

17. The optical imaging lens according to claim 15, further satisfying: $TL/(G89+Tmax) \leq 4.700$, wherein TL is a distance from the object-side surface of the first lens element to the image-side surface of the ninth lens element on the optical axis, G89 is an air gap between the eighth lens element and the ninth lens element on the optical axis, and Tmax is a maximum thickness of nine lens elements from the first lens element to the ninth lens element on the optical axis.

18. The optical imaging lens according to claim 15, further satisfying: $AAG/(T1+BFL) \leq 1.650$, wherein AAG is a sum of eight air gaps from the first lens element to the ninth lens element on the optical axis, T1 is a thickness of the first lens element on the optical axis, and BFL is a distance from the image-side surface of the ninth lens element to an image plane on the optical axis.

19. The optical imaging lens according to claim 15, further satisfying: $T6/T4 \geq 1.600$, wherein T4 is a thickness of the fourth lens element on the optical axis, and T6 is a thickness of the sixth lens element on the optical axis.

20. The optical imaging lens according to claim 15, further satisfying: $(T6+T8)/T7 \geq 2.000$, wherein T6 is a thickness of the sixth lens element on the optical axis, T7 is a thickness of the seventh lens element on the optical axis, and T8 is a thickness of the eighth lens element on the optical axis.

* * * * *